United States Patent
Reeves et al.

(10) Patent No.: US 7,056,370 B2
(45) Date of Patent: *Jun. 6, 2006

(54) ELECTRODE SELF-CLEANING MECHANISM FOR AIR CONDITIONER DEVICES

(75) Inventors: John Paul Reeves, Hong Kong (CN); Shek Fai Lau, Foster City, CA (US); Andrew J. Parker, Novato, CA (US)

(73) Assignee: Sharper Image Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,969

(22) Filed: Mar. 23, 2005

(65) Prior Publication Data

US 2005/0160906 A1    Jul. 28, 2005

Related U.S. Application Data

(63) Continuation of application No. 10/835,743, filed on Apr. 30, 2004, now Pat. No. 6,908,501, which is a continuation of application No. 10/287,193, filed on Oct. 21, 2002, now Pat. No. 6,749,667.

(60) Provisional application No. 60/391,070, filed on Jun. 20, 2002.

(51) Int. Cl.
    *B03C 3/74* (2006.01)
(52) U.S. Cl. .................. 96/29; 96/40; 96/51; 96/96
(58) Field of Classification Search .............. 96/29, 96/34, 40, 51, 96; 95/74–76; 422/186.04; 361/225–235
See application file for complete search history.

(56) References Cited

U.S. PATENT DOCUMENTS

| 653,421 A | 7/1900 | Lorey |
|---|---|---|
| 995,958 A | 6/1911 | Goldberg |
| 1,791,338 A | 2/1931 | Wintermute |
| 1,869,335 A | 7/1932 | Day |
| 2,327,588 A | 8/1943 | Bennett |
| 2,359,057 A | 9/1944 | Skinner |
| 2,509,548 A | 5/1950 | White |
| 2,949,550 A | 8/1960 | Brown |
| 3,018,394 A | 1/1962 | Brown |
| 3,026,964 A | 3/1962 | Penney |

(Continued)

FOREIGN PATENT DOCUMENTS

CN    2111112 U    7/1972

(Continued)

OTHER PUBLICATIONS

U.S. Appl. No. 60/104,573, filed Oct. 16, 1998, Krichtafovitch.

(Continued)

*Primary Examiner*—Richard L. Chiesa
(74) *Attorney, Agent, or Firm*—Bell Boyd & Lloyd LLC

(57) ABSTRACT

An air conditioner with a cleaning member having an opening, through which a wire-like electrode passes. The member is moved along the wire to frictionally clean the wire-like electrode when a collector electrode array is moved. A lifting arm is mounted to the collector electrode. The lifting arm can move the member to clean the wire-like electrode as the collector electrode is moved (e.g., removed from the air conditioner for cleaning).

20 Claims, 17 Drawing Sheets

U.S. PATENT DOCUMENTS

| | | |
|---|---|---|
| 3,374,941 A | 3/1968 | Okress |
| 3,518,462 A | 6/1970 | Brown |
| 3,540,191 A | 11/1970 | Herman |
| 3,581,470 A | 6/1971 | Aitkenhead et al. |
| 3,638,058 A | 1/1972 | Fritzius |
| 3,744,216 A | 7/1973 | Halloran |
| 3,981,695 A | 9/1976 | Fuchs |
| 3,984,215 A | 10/1976 | Zucker |
| 4,052,177 A | 10/1977 | Kide |
| 4,092,134 A | 5/1978 | Kikuchi |
| 4,102,654 A | 7/1978 | Pellin |
| 4,138,233 A | 2/1979 | Masuda |
| 4,209,306 A | 6/1980 | Feldman et al. |
| 4,227,894 A | 10/1980 | Proynoff |
| 4,231,766 A | 11/1980 | Spurgin |
| 4,232,355 A | 11/1980 | Finger et al. |
| 4,244,710 A | 1/1981 | Burger |
| 4,244,712 A | 1/1981 | Tongret |
| 4,253,852 A | 3/1981 | Adams |
| 4,259,452 A | 3/1981 | Yukuta et al. |
| 4,266,948 A | 5/1981 | Teague et al. |
| 4,282,014 A | 8/1981 | Winkler et al. |
| 4,284,420 A | 8/1981 | Borysiak |
| 4,318,718 A | 3/1982 | Utsumi et al. |
| 4,342,571 A | 8/1982 | Hayashi |
| 4,357,150 A | 11/1982 | Masuda et al. |
| 4,386,395 A | 5/1983 | Francis, Jr. |
| 4,413,225 A | 11/1983 | Donig et al. |
| 4,445,911 A | 5/1984 | Lind |
| 4,477,263 A | 10/1984 | Shaver et al. |
| 4,496,375 A | 1/1985 | Le Vantine |
| 4,502,002 A | 2/1985 | Ando |
| 4,509,958 A | 4/1985 | Masuda et al. |
| 4,516,991 A | 5/1985 | Kawashima |
| 4,536,698 A | 8/1985 | Shevalenko et al. |
| 4,587,475 A | 5/1986 | Finney, Jr. et al. |
| 4,600,411 A | 7/1986 | Santamaria |
| 4,601,733 A | 7/1986 | Ordines et al. |
| 4,626,261 A | 12/1986 | Jorgensen |
| 4,643,745 A | 2/1987 | Sakakibara et al. |
| 4,659,342 A | 4/1987 | Lind |
| 4,674,003 A | 6/1987 | Zylka |
| 4,686,370 A | 8/1987 | Blach |
| 4,689,056 A | 8/1987 | Noguchi et al. |
| 4,694,376 A | 9/1987 | Gesslauer |
| 4,713,093 A | 12/1987 | Hansson |
| 4,713,724 A | 12/1987 | Voelkel |
| 4,726,812 A | 2/1988 | Hirth |
| 4,726,814 A | 2/1988 | Weitman |
| 4,772,297 A | 9/1988 | Anzai |
| 4,779,182 A | 10/1988 | Mickal et al. |
| 4,781,736 A | 11/1988 | Cheney et al. |
| 4,786,844 A | 11/1988 | Farrell et al. |
| 4,789,801 A | 12/1988 | Lee |
| 4,808,200 A | 2/1989 | Dallhammer et al. |
| 4,811,159 A | 3/1989 | Foster, Jr. |
| 4,940,470 A | 7/1990 | Jaisinghani et al. |
| 4,941,068 A | 7/1990 | Hofmann |
| 4,955,991 A | 9/1990 | Torok et al. |
| 4,967,119 A | 10/1990 | Torok et al. |
| 4,976,752 A | 12/1990 | Torok et al. |
| D315,598 S | 3/1991 | Yamamoto et al. |
| 5,006,761 A | 4/1991 | Torok et al. |
| 5,010,869 A | 4/1991 | Lee |
| 5,012,093 A | 4/1991 | Shimizu |
| 5,012,159 A | 4/1991 | Torok et al. |
| 5,024,685 A | 6/1991 | Torok et al. |
| 5,053,912 A | 10/1991 | Loreth et al. |
| 5,077,500 A | 12/1991 | Torok et al. |
| RE33,927 E | 5/1992 | Fuzimura |
| 5,141,529 A | 8/1992 | Oakley et al. |
| D329,284 S | 9/1992 | Patton |
| D332,655 S | 1/1993 | Lytle et al. |
| 5,180,404 A | 1/1993 | Loreth et al. |
| 5,183,480 A | 2/1993 | Raterman et al. |
| 5,196,171 A | 3/1993 | Peltier |
| 5,215,558 A | 6/1993 | Moon |
| 5,217,504 A | 6/1993 | Johansson |
| 5,248,324 A | 9/1993 | Hara |
| 5,266,004 A | 11/1993 | Tsumurai et al. |
| 5,290,343 A | 3/1994 | Morita et al. |
| 5,296,019 A | 3/1994 | Oakley et al. |
| 5,302,190 A | 4/1994 | Williams |
| 5,315,838 A | 5/1994 | Thompson |
| 5,316,741 A | 5/1994 | Sewell et al. |
| 5,378,978 A | 1/1995 | Gallo et al. |
| 5,435,817 A | 7/1995 | Davis et al. |
| 5,437,713 A | 8/1995 | Chang |
| 5,484,472 A | 1/1996 | Weinberg |
| 5,532,798 A | 7/1996 | Nakagami et al. |
| 5,535,089 A | 7/1996 | Ford et al. |
| D375,546 S | 11/1996 | Lee |
| 5,578,112 A | 11/1996 | Krause |
| D377,523 S | 1/1997 | Marvin et al. |
| 5,601,636 A | 2/1997 | Glucksman |
| 5,641,342 A | 6/1997 | Smith et al. |
| 5,656,063 A | 8/1997 | Hsu |
| 5,667,564 A | 9/1997 | Weinberg |
| 5,669,963 A | 9/1997 | Horton et al. |
| 5,698,164 A | 12/1997 | Kishioka et al. |
| 5,702,507 A | 12/1997 | Wang |
| D389,567 S | 1/1998 | Gudefin |
| 5,766,318 A | 6/1998 | Loreth et al. |
| 5,779,769 A | 7/1998 | Jiang |
| 5,814,135 A | 9/1998 | Weinberg |
| 5,879,435 A | 3/1999 | Satyapal et al. |
| 5,893,977 A | 4/1999 | Pucci |
| 5,911,957 A | 6/1999 | Khatchatrian et al. |
| 5,972,076 A | 10/1999 | Nichols et al. |
| 5,975,090 A | 11/1999 | Taylor et al. |
| 5,980,614 A | 11/1999 | Loreth et al. |
| 5,993,521 A | 11/1999 | Loreth et al. |
| 5,997,619 A | 12/1999 | Knuth et al. |
| 6,019,815 A | 2/2000 | Satyapal et al. |
| 6,042,637 A | 3/2000 | Weinberg |
| 6,063,168 A | 5/2000 | Nichols et al. |
| 6,086,657 A | 7/2000 | Freije |
| 6,117,216 A | 9/2000 | Loreth |
| 6,118,645 A | 9/2000 | Partridge |
| 6,126,722 A | 10/2000 | Mitchell et al. |
| 6,126,727 A | 10/2000 | Lo |
| 6,149,717 A | 11/2000 | Satyapal et al. |
| 6,149,815 A | 11/2000 | Sauter |
| 6,152,146 A | 11/2000 | Taylor et al. |
| 6,163,098 A | 12/2000 | Taylor et al. |
| 6,176,977 B1 | 1/2001 | Taylor et al. |
| 6,182,461 B1 | 2/2001 | Washburn et al. |
| 6,182,671 B1 | 2/2001 | Taylor et al. |
| 6,193,852 B1 | 2/2001 | Caracciolo et al. |
| 6,203,600 B1 | 3/2001 | Loreth |
| 6,212,883 B1 | 4/2001 | Kang |
| 6,228,149 B1 | 5/2001 | Alenichev et al. |
| 6,252,012 B1 | 6/2001 | Egitto et al. |
| 6,270,733 B1 | 8/2001 | Rodden |
| 6,277,248 B1 | 8/2001 | Ishioka et al. |
| 6,282,106 B1 | 8/2001 | Grass |
| D449,097 S | 10/2001 | Smith et al. |
| D449,679 S | 10/2001 | Smith et al. |
| 6,302,944 B1 | 10/2001 | Hoenig |
| 6,309,514 B1 | 10/2001 | Conrad et al. |
| 6,312,507 B1 | 11/2001 | Taylor et al. |
| 6,315,821 B1 | 11/2001 | Pillion et al. |
| 6,328,791 B1 | 12/2001 | Pillion et al. |
| 6,348,103 B1 | 2/2002 | Ahlborn et al. |

| | | | | | | |
|---|---|---|---|---|---|---|
| 6,350,417 B1 | 2/2002 | Lau et al. | | DE | 2206057 | 8/1973 |
| 6,362,604 B1 | 3/2002 | Cravey | | EP | 0433152 A1 | 12/1990 |
| 6,372,097 B1 | 4/2002 | Chen | | EP | 0332624 B1 | 1/1992 |
| 6,373,723 B1 | 4/2002 | Wallgren et al. | | FR | 2690509 | 10/1993 |
| 6,379,427 B1 | 4/2002 | Siess | | GB | 643363 | 9/1950 |
| 6,391,259 B1 | 5/2002 | Malkin et al. | | JP | S51-90077 | 8/1976 |
| 6,398,852 B1 | 6/2002 | Loreth | | JP | S62-20653 | 2/1987 |
| 6,447,587 B1 | 9/2002 | Pillion et al. | | JP | 10137007 | 5/1998 |
| 6,451,266 B1 | 9/2002 | Lau et al. | | JP | 11104223 | 4/1999 |
| 6,464,754 B1 | 10/2002 | Ford | | JP | 2000236914 | 9/2000 |
| 6,471,753 B1 | 10/2002 | Ahn et al. | | WO | WO92/05875 A1 | 4/1992 |
| 6,494,940 B1 | 12/2002 | Hak | | WO | WO96/04703 A1 | 2/1996 |
| 6,504,308 B1 | 1/2003 | Krichtafovitch et al. | | WO | WO99/07474 A1 | 2/1999 |
| 6,508,982 B1 | 1/2003 | Shoji | | WO | WO00/10713 A1 | 3/2000 |
| 6,544,485 B1 | 4/2003 | Taylor | | WO | WO01/47803 A1 | 7/2001 |
| 6,585,935 B1 | 7/2003 | Taylor et al. | | WO | WO01/48781 A1 | 7/2001 |
| 6,588,434 B1 | 7/2003 | Taylor et al. | | WO | WO01/64349 A1 | 9/2001 |
| 6,603,268 B1 | 8/2003 | Lee | | WO | WO01/85348 A2 | 11/2001 |
| 6,613,277 B1 | 9/2003 | Monagan | | WO | WO02/20162 A2 | 3/2002 |
| 6,632,407 B1 | 10/2003 | Lau et al. | | WO | WO02/20163 A2 | 3/2002 |
| 6,635,105 B1 | 10/2003 | Ahlborn et al. | | WO | WO02/30574 A1 | 4/2002 |
| 6,672,315 B1 | 1/2004 | Taylor et al. | | WO | WO02/32578 A1 | 4/2002 |
| 6,709,484 B1 | 3/2004 | Lau et al. | | WO | WO02/42003 A1 | 5/2002 |
| 6,713,026 B1 | 3/2004 | Taylor et al. | | WO | WO02/066167 A1 | 8/2002 |
| 6,749,667 B1 | 6/2004 | Reeves et al. | | WO | WO03/009944 A1 | 2/2003 |
| 6,855,190 B1 * | 2/2005 | Nikkhah ............ 96/51 | | WO | WO03/013620 A1 | 2/2003 |
| 6,908,501 B1 * | 6/2005 | Reeves et al. ........ 96/29 | | WO | WO03/013734 AA | 2/2003 |
| 6,911,186 B1 * | 6/2005 | Taylor et al. ........ 422/186.07 | | | | |
| 2001/0048906 A1 | 12/2001 | Lau et al. | | | | |
| 2002/0069760 A1 | 6/2002 | Pruette et al. | | | | |
| 2002/0079212 A1 | 6/2002 | Taylor et al. | | | | |
| 2002/0098131 A1 | 7/2002 | Taylor et al. | | | | |
| 2002/0122751 A1 | 9/2002 | Sinaiko et al. | | | | |
| 2002/0122752 A1 | 9/2002 | Taylor et al. | | | | |
| 2002/0127156 A1 | 9/2002 | Taylor | | | | |
| 2002/0134664 A1 | 9/2002 | Taylor et al. | | | | |
| 2002/0134665 A1 | 9/2002 | Taylor et al. | | | | |
| 2002/0141914 A1 | 10/2002 | Lau et al. | | | | |
| 2002/0144601 A1 | 10/2002 | Palestro et al. | | | | |
| 2002/0146356 A1 | 10/2002 | Sinaiko et al. | | | | |
| 2002/0150520 A1 | 10/2002 | Taylor et al. | | | | |
| 2002/0152890 A1 | 10/2002 | Leiser | | | | |
| 2002/0155041 A1 | 10/2002 | McKinney, Jr. et al. | | | | |
| 2002/0170435 A1 | 11/2002 | Joannou | | | | |
| 2002/0190658 A1 | 12/2002 | Lee | | | | |
| 2002/0195951 A1 | 12/2002 | Lee | | | | |
| 2003/0005824 A1 | 1/2003 | Katou et al. | | | | |
| 2003/0206837 A1 | 11/2003 | Taylor et al. | | | | |
| 2003/0206839 A1 | 11/2003 | Taylor et al. | | | | |
| 2003/0206840 A1 | 11/2003 | Taylor et al. | | | | |
| 2004/0033176 A1 | 2/2004 | Lee et al. | | | | |
| 2004/0052700 A1 | 3/2004 | Kotlyar et al. | | | | |
| 2004/0065202 A1 | 4/2004 | Gatchell et al. | | | | |
| 2004/0136863 A1 | 7/2004 | Yates et al. | | | | |
| 2004/0166037 A1 | 8/2004 | Youdall et al. | | | | |
| 2004/0226447 A1 | 11/2004 | Lau et al. | | | | |
| 2004/0234431 A1 | 11/2004 | Taylor et al. | | | | |
| 2004/0237787 A1 | 12/2004 | Reeves et al. | | | | |
| 2004/0251124 A1 | 12/2004 | Lau | | | | |
| 2004/0251909 A1 | 12/2004 | Taylor et al. | | | | |
| 2005/0000793 A1 | 1/2005 | Taylor et al. | | | | |

FOREIGN PATENT DOCUMENTS

| | | |
|---|---|---|
| CN | 87210843 U | 7/1988 |
| CN | 2138764 Y | 6/1993 |
| CN | 2153231 Y | 12/1993 |

OTHER PUBLICATIONS

"Zenion Elf Device," drawing, prior art, undated.

Electrical schematic and promotional material available from Zenion Industries, 7 pages, Aug. 1990.

Promotional material available from Zenion Industries for the Plasma-Pure 100/200/300, 2 pages, Aug. 1990.

Promotional material available from Zenion Industries for the Plasma-Tron, 2 pages, Aug. 1990.

LENTEK Sila™ Plug-In Air Purifier/Deodorizer product box copyrighted 1999, 13 pages.

Trion Console 250 Electronic Air Cleaner, Model Series 442857 and 445600, Manual for Installation•Operation•Maintenance, Trion Inc., 7 pp., believed to be at least one year prior to Nov. 5, 1998.

Trion 350 Air Purifier, Model 450111-010, http://www.feddersoutlet.com/trion350.html, 12 pp., believed to be at least one year prior to Nov. 5, 1998.

Trion 150 Air Purifier, Model 45000-002, http://www.feddersoutlet.com/trion150.html, 11 pp., believed to be at least one year prior to Nov. 5, 1998.

Trion 120 Air Purifier, Model 442501-025, http://www.feddersoutled.com/trion120.html, 16 pp., believed to be at least one year prior to Nov. 5, 1998.

Friedrich C-90A Electronic Air Cleaner, Service Information, Friedrich Air Conditioning Co., 12 pp., 1985.

LakeAir Excel and Maxum Portable Electronic Air Cleaners, Operating and Service Manual, LakeAir International, Inc., 11 pp., 1971.

Blueair AV 402 Air Purifier, http://www.air-purifiers-usa.biz/Blueair_AV402.htm, 4 pp., 1996.

Blueair AV 501 Air Purifier, http://www.air-purifiers-usa.biz/Blueair_AV501.htm, 15 pp., 1997.

* cited by examiner

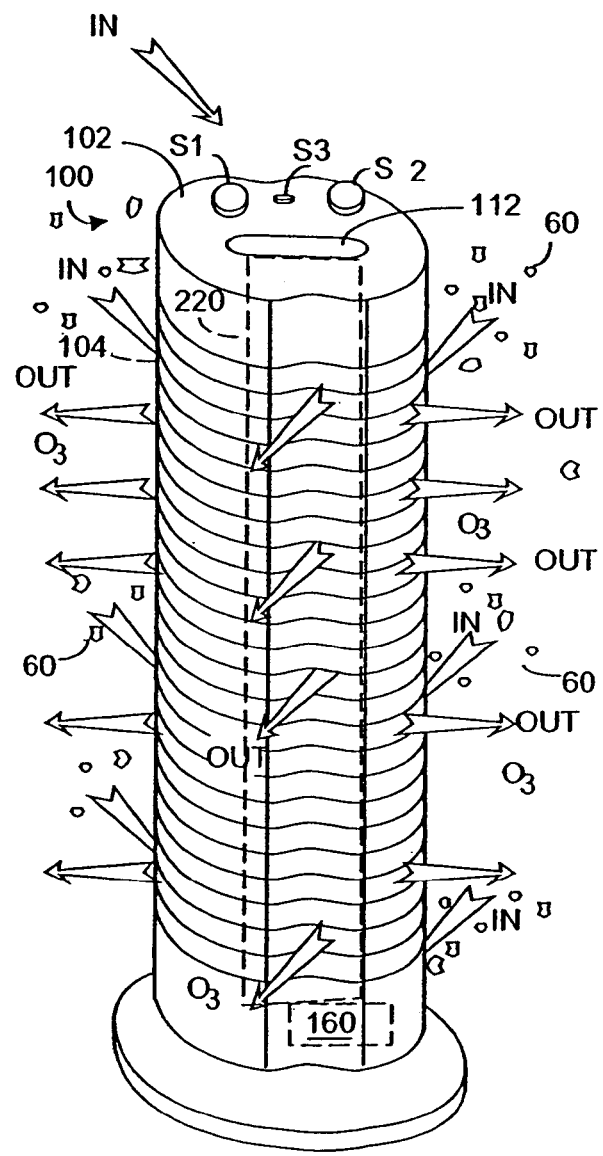
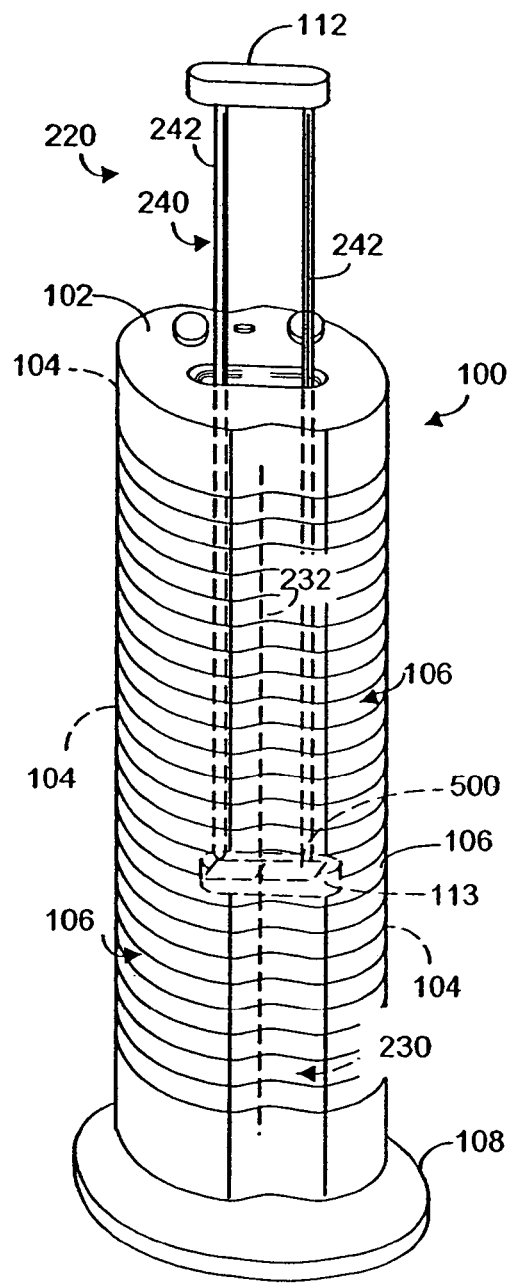
FIG. 2A
FIG. 2B

ELECTRODE SELF-CLEANING MECHANISM FOR AIR CONDITIONER DEVICES

PRIORITY CLAIM

This application is a continuation of U.S. patent application Ser. No. 10/835,743, filed on Apr. 30, 2004 (now U.S. Pat. No. 6,908,501), which is a continuation of 10/278,193, filed Oct. 21, 2002 (now U.S. Pat. No. 6,749,667), which claims priority to U.S. Provisional Patent Application 60/391,070, filed Jun. 20, 2002. This application is further a continuation-in-part of co-pending U.S. patent application Ser. No. 11/064,797, filed on Feb. 24, 2005, which is a continuation of U.S. patent application Ser. No. 10/074,347, filed Feb. 12, 2002 (now U.S. Pat. No. 6,911,186), which claims priority to U.S. Provisional Patent Application No. 60/340,702, filed Dec. 13, 2001, and is a continuation of co-pending U.S. patent application Ser. No. 09/924,624, filed on Aug. 8, 2001, which claims priority to U.S. Provisional Patent Application No. 60/306,479, filed on Jul. 18, 2001, and is a continuation-in-part of U.S. patent application Ser. No. 09/774,198, filed on Jan. 29, 2001 (now U.S. Pat. No. 6,544,485), which is a continuation-in-part of U.S. patent application Ser. No. 09/730,499, filed on Dec. 5, 2001 (now U.S. Pat. No. 6,713,026), which is a continuation of U.S. patent application Ser. No. 09/564,960, filed on May 4, 2000 (now U.S. Pat. No. 6,350,417), which is a continuation-in-part of U.S. patent application Ser. No. 09/186,471, filed on Nov. 5, 1998 (now U.S. Pat. No. 6,176,977). Each of the above-identified applications and patents are hereby incorporated herein by reference for all purposes.

FIELD OF THE INVENTION

This invention relates generally to devices that produce ozone and an electro-kinetic flow of air from which particulate matter has been substantially removed, and more particularly to cleaning the wire or wire-like electrodes present in such devices.

The use of an electric motor to rotate a fan blade to create an air flow has long been known in the art. Unfortunately, such fans produce substantial noise, and can present a hazard to children who can be tempted to poke a finger or a pencil into the moving fan blade. Although such fans can produce substantial air flow, e.g., 1,000 ft³/minute or more, substantial electrical power is required to operate the motor, and essentially no conditioning of the flowing air occurs.

BACKGROUND OF THE INVENTION

It is known to provide such fans with a HEPA-compliant filter element to remove particulate matter larger than perhaps 0.3 μm. Unfortunately, the resistance to air flow presented by the filter element can require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an air flow using electro-kinetic techniques, by which electrical power is directly converted into a flow of air without mechanically moving components. One such system is described in U.S. Pat. No. 4,789,801 to Lee (1988), depicted herein in simplified form as FIGS. 1A and 1B. Lee's system 10 includes an array of small area ("minisectional") electrodes 20 that are spaced-apart symmetrically from an array of larger area ("maxisectional") electrodes 30. The positive terminal of a pulse generator 40 that outputs a train of high voltage pulses (e.g., 0 to perhaps +5 KV) is coupled to the minisectional array, and the negative pulse generator terminal is coupled to the maxisectional array.

The high voltage pulses ionize the air between the arrays, and an air flow 50 from the minisectional array toward the maxisectional array results, without requiring any moving parts. Particulate matter 60 in the air is entrained within the airflow 50 and also moves towards the maxisectional electrodes 30. Much of the particulate matter is electrostatically attracted to the surface of the maxisectional electrode array, where it remains, thus conditioning the flow of air exiting system 10. Further, the high voltage field present between the electrode arrays can release ozone into the ambient environment, which appears to destroy or at least alter whatever is entrained in the airflow, including for example, bacteria.

In the embodiment of FIG. 1A, minisectional electrodes 20 are circular in cross-section, having a diameter of about 0.003" (0.08 mm), whereas the maxisectional electrodes 30 are substantially larger in area and define a "teardrop" shape in cross-section. The ratio of cross-sectional radii of curvature between the maxisectional and minisectional electrodes, from Lee's figures, appears to exceed 10:1. As shown in FIG. 1A herein, the bulbous front surfaces of the maxisectional electrodes face the minisectional electrodes, and the somewhat sharp trailing edges face the exit direction of the air flow. The "sharpened" trailing edges on the maxisectional electrodes apparently promote good electrostatic attachment of particular matter entrained in the airflow. Lee does not disclose how the teardrop shaped maxisectional electrodes are fabricated, but presumably it is produced using a relatively expensive mold-casting or an extrusion process.

In another embodiment shown herein as FIG. 1B, Lee's maxisectional sectional electrodes 30 are symmetrical and elongated in cross-section. The elongated trailing edges on the maxisectional electrodes provide increased area upon which particulate matter entrained in the airflow can attach. Lee states that precipitation efficiency and desired reduction of anion release into the environment can result from including a passive third array of electrodes 70. Understandably, increasing efficiency by adding a third array of electrodes will contribute to the cost of manufacturing and maintaining the resultant system.

While the electrostatic techniques disclosed by Lee are advantageous over conventional electric fan-filter units, Lee's maxisectional electrodes are relatively expensive to fabricate. Further, increased filter efficiency beyond what Lee's embodiments can produce would be advantageous, especially without including a third array of electrodes.

The invention in applicants' parent application provided a first and second electrode array configuration electro-kinetic air transporter-conditioner having improved efficiency over Lee-type systems, without requiring expensive production techniques to fabricate the electrodes. The condition also permitted user-selection of acceptable amounts of ozone to be generated.

The second array electrodes were intended to collect particulate matter and to be user-removable from the transporter-conditioner for regular cleaning to remove such matter from the electrode surfaces. The user must take care, however, to ensure that if the second array electrodes were cleaned with water, that the electrodes are thoroughly dried before reinsertion into the transporter-conditioner unit. If the unit were turned on while moisture from newly cleaned electrodes was allowed to pool within the unit, and moisture wicking could result in high voltage arcing from the first to the second electrode arrays, with possible damage to the unit.

The wire or wire-like electrodes in the first electrode array are less robust than the second array electrodes. (The terms "wire" and "wire-like" shall be used interchangeably herein to mean an electrode either made from a wire or, if thicker or stiffer than a wire, having the appearance of a wire.) In embodiments in which the first array electrodes were user-removable from the transporter-conditioner unit, care was required during cleaning to prevent excessive force from simply snapping the wire electrodes. But eventually the first array electrodes can accumulate a deposited layer or coating of fine ash-like material.

If this deposit is allowed to accumulate eventually efficiency of the conditioner-transporter will be degraded. Further, for reasons not entirely understood, such deposits can produce an audible oscillation that can be annoying to persons near the conditioner-transporter.

Thus there is a need for a mechanism by a conditioner-transporter unit can be protected against moisture pooling in the unit as a result of user cleaning. Further there is a need for a mechanism by which the wire electrodes in the first electrode array of a conditioner-transporter can be periodically cleaned. Preferably such cleaning mechanism should be straightforward to implement, should not require removal of the first array electrodes from the conditionertransporter, and should be operable by a user on a periodic basis.

The present invention provides such a method and apparatus.

SUMMARY OF THE INVENTION

The present invention is directed to improvements with respect to state of art. In particular, the present invention includes an air cleaner having at least an emitter electrode and at least a collector electrode. An embodiment of the invention includes a bead or other object having a bore there through, with the emitter electrode provided through said bore of the bead or other object. A bead or object moving arm is provided in the air cleaner and is operatively associated with the bead or object, in order to move the bead or object relative to the emitter electrode in order to clean the emitter electrode.

In another aspect of the invention, the collector electrode is removable from the air-cleaner for cleaning and the bead or object moving arm is operatively associated with the collector electrode such as the collector electrode is removed from the air cleaner, the bead or object moving arm moves said bead or object in order to clear said emitter electrode.

In a further aspect of the invention, the air cleaner includes a housing with a top and a base, and wherein the collector electrode is movable through said top in order to be cleaned, and wherein as such collector electrode is removed from the top, said bead or object moving arm moves said bead or object towards the top in order to clean the emitter electrode.

In yet a further aspect of the invention, the emitter electrode has a bottom end stop on which said bead can rest when the bead is at the bottom of the emitter electrode. The bead moving arm is moveably mounted to the collector electrode such that with the bead or object resting on said bottom end stop, said bead or object moving arm can move past said bead or object and reposition under said bead or object in preparation for moving said bead or object to clean said emitter electrode.

In a further aspect of the invention, a method to clean an air-cleaner, which air cleaner has a housing with a top and base, and wherein said air cleaner includes a first electrode, a second electrode array, and a bead or object mounted on the first electrode and a bead or object moving arm mounted on the second electrode array, includes the steps of removing said second electrode array from the top of said housing, and simultaneously moving said bead or object along the first electrode as urged by the bead or object moving arm in order to clean said first electrode.

Other features and advantages of the invention will appear from the following description in which embodiments have been set forth in detail, in conjunction with the accompanying drawings.

BRIEF DESCRIPTION OF THE DRAWINGS

FIG. 2A is an perspective view of an embodiment of the present invention;

FIG. 2B is a perspective view of the embodiment of FIG. 2A, with the second array electrode assembly partially withdrawn depicting a mechanism for self-cleaning the first array electrode assembly, according to the present invention;

DETAILED DESCRIPTION OF THE PREFERRED EMBODIMENT

Figure 1A:
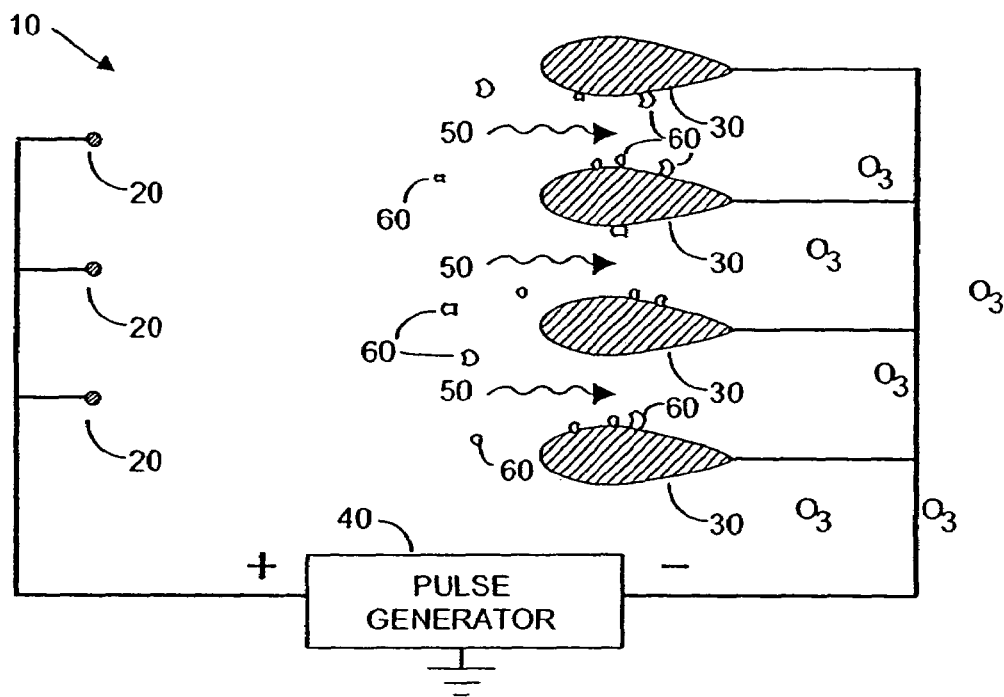
FIG. 1A is a plan, cross-sectional view, of a first embodiment of a prior art electro-kinetic air transporter-conditioner system, according to the prior art.
Figure 1B:
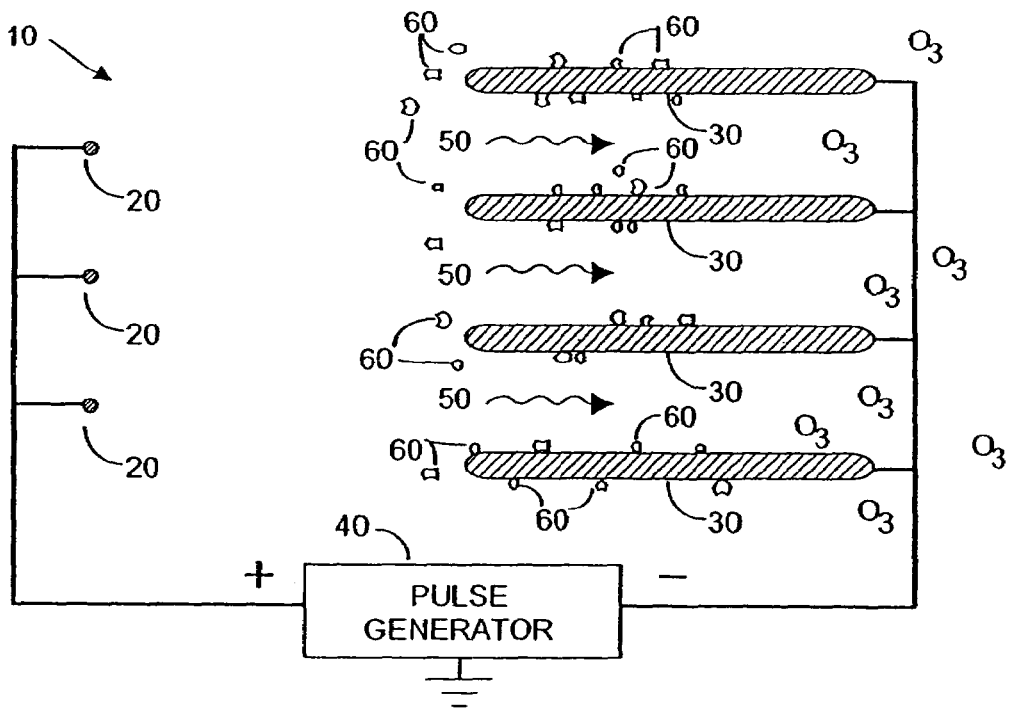
FIG. 1B is a plan, cross-sectional view, of a second embodiment of a prior art electro-kinetic air transporter-conditioner system, according to the prior art.

The following description is presented to enable any person skilled in the art to make and use the invention. Various modifications to the embodiments described will be readily apparent to those skilled in the art, and the generic principles defined herein may be applied to other embodiments and applications without departing from the spirit and scope of the present invention as defined in the appended claims. Thus, the present invention is not intended to be limited to the embodiments shown, but is to be accorded the widest scope consistent with the principles and features disclosed herein. To the extent necessary to afford a complete understanding of the invention disclosed, the specification and drawings of all patents and patent applications cited in this application are incorporated herein by reference.

As a general introduction, applicants' parent application provides an electro-kinetic system for transporting and conditioning air without moving parts. The air is conditioned in the sense that it is ionized and contains appropriate amounts of ozone and removes at least some airborne particles. The electro-kinetic air transporter-conditioner disclosed therein includes a louvered or grilled body that houses an ionizer unit. The ionizer unit includes a high voltage DC inverter that boosts common 110 VAC to high voltage and a generator that receives the high voltage DC and outputs high voltage pulses of perhaps 10 KV peak-to-peak, although an essentially 100% duty cycle (e.g., high voltage DC) output could be used instead of pulses. The unit also includes an electrode assembly unit comprising first and second spaced-apart arrays of conducting electrodes, the first array and second array being coupled, respectively, preferably to the positive and negative output ports of the high voltage generator.

The electrode assembly preferably is formed using first and second arrays of readily manufacturable electrode configurations. In the embodiments relevant to this present application, the first array included wire (or wire-like) electrodes. The second array comprised "U"-shaped or "L"-shaped electrodes having one or two trailing surfaces and intentionally large outer surface areas upon which to collect particulate matter in the air. In the preferred embodiments, the ratio between effective radii of curvature of the second array electrodes to the first array electrodes was at least about 20:1.

The high voltage pulses create an electric field between the first and second electrode arrays. This field produces an electro-kinetic airflow going from the first array toward the second array, the airflow being rich in preferably a net surplus of negative ions and in ozone. Ambient air including dust particles and other undesired components (germs perhaps) enter the housing through the grill or lover openings, and ionized clean air (with ozone) exits through openings on the downstream side of the housing.

The dust and other particulate matter attaches electrostatically to the second array (or collector) electrodes, and the output air is substantially clean or such particulate matter. Further, ozone generated by the transporter-conditioner unit can kill certain types of germs and the like, and also eliminates odors in the output air. Preferably the transporter operates in periodic bursts, and a control permits the user to temporarily increase the high voltage pulse generator output, e.g., to more rapidly eliminate odors in the environment.

Applicants' parent application provided second array electrode units that were very robust and user-removable from the transporter-conditioner unit for cleaning. These second array electrode units could simply be slid up and out of the transporter-conditioner unit, and wiped clean with a moist cloth, and returned to the unit. However on occasion, if electrode units are returned to the transporter-conditioner unit while still wet (from cleaning), moisture pooling can reduce resistance between the first and second electrode arrays to where high voltage arcing results.

Another problem is that over time the wire electrodes in the first electrode array become dirty and can accumulate a deposited layer or coating of fine ash-like material. This accumulated material on the first array electrodes can eventually reduce ionization efficiency. Further, this accumulated coating can also result in the transporter-conditioner unit producing 500 Hz to 5 KHz audible oscillations that can annoy people in the same room as the unit.

In a first embodiment, the present invention extends one or more thin flexible sheets of MYLAR (polyester film) or KAPTON (polyamide) film type material from the lower portion of the removable second array electrode unit. This sheet or sheets faces the first array electrodes and is nominally in a plane perpendicular to the longitudinal axis of the first and second array electrodes. Such sheet material has high voltage breakdown, high dielectric constant, can withstand high temperature, and is flexible. A slit is cut in the distal edge of this sheet for each first array electrode such that each wire first array electrode fits into a slit in this sheet. Whenever the user removes the second electrode array from the transporter-conditioner unit, the sheet of material is also removed. However in the removal process, the sheet of material is also pulled upward, and friction between the inner slit edge surrounding each wire tends to scrape off any coating on the first array electrode. When the second array electrode unit is reinserted into the transporter-conditioner unit, the slits in the sheet automatically surround the associated first electrode array electrode. Thus, there is an up and down scraping action on the first electrode array electrodes whenever the second electrode array unit is removed from, or simply moved up and down within, the transporter-conditioner unit.

Optionally, upwardly projecting pillars can be disposed on the inner bottom surface of the transporter-conditioner unit to deflect the distal edge of the sheet material upward, away from the first array electrodes when the second array electrode unit is fully inserted. This feature reduces the likelihood of the sheet itself lowering the resistance between the two electrode arrays.

In a presently preferred embodiment, the lower ends of the second array electrodes are mounted to a retainer that includes pivotable arms to which a strip of MYLAR or KAPTON type material is attached. Alternatively two overlapping strips of material can be so attached. The distal edge of each strip includes a slit, and the each strip (and the slit therein) is disposed to self-align with an associated wire electrode. A pedestal extends downward from the base of the retainer, and when fully inserted in the transporter-conditioner unit, the pedestal extends into a pedestal opening in a sub-floor of the unit. The first electrode array-facing walls of the pedestal opening urge the arms and the strip on each arm to pivot upwardly, from a horizontal to a vertical disposition. This configuration can improve resistance between the electrode arrays.

Yet another embodiment provides a cleaning mechanism for the wires in the first electrode array in which one or more bead-like members surrounds each wire, the wire electrode passing through a channel in the bead. When the transporter-conditioner unit is inverted, top-for-bottom and then bottom-for-top, the beads slide the length of the wire they surround, scraping off debris in the process. The beads embodiments may be combined with any or all of the various sheets embodiments to provide mechanisms allowing a user to safely clean the wire electrodes in the first electrode array in a transporter-conditioner unit.

Further as evident from a review of the current specification, embodiments of the invention include a bead and a bead lifting arm, which is operatively associated with both the bead and the collector electrodes. When the collector electrodes are removed for cleaning, the bead lifting arm engages the bead in order to urge the bead upwardly along the emitter electrode in order to clean the emitter electrode. As the collector electrodes are removed from the housing, the bead lifting arm disengages from the bead, allowing the bead to fall to the bottom of the emitter electrode. When the collector electrodes are reinserted into the housing, the bead lifting arm re-engages the bead, which is now located at the bottom of the emitter electrode.

FIGS. 2A and 2B depict an electro-kinetic air transporter-conditioner system 100 whose housing 102 includes rear-located intake vents or louvers 104. Additionally housing 102 includes front and side-located exhaust vents 106, and a base pedestal 108. Internal to the transporter housing is an ion generating unit 160, powered by a power supply that is energizable or excitable using switch S1. Suitable power supplies include for example, AC:DC power supply. Ion generating unit 160 is self-contained in that other than ambient air, nothing is required from beyond the transporter housing, save external operating potential, for operation of the present invention.

The upper surface of housing 102 includes a user-liftable handle member 112 to which is affixed a second array 240 of electrodes 242 within an electrode assembly 220. Electrode assembly 220 also comprises a first array of electrodes 230, shown here as a single wire or wire-like electrode 232. In the embodiment shown, lifting member 112 in the form of a handle, enables the user to lift the second array electrodes 240 up and, if desired, out of unit 100, while the first electrode array 230 remains within unit 100. In FIG. 2B, the bottom ends of second array electrode 242 are connected to a base member 113, to which is attached a mechanism 500 for cleaning the first electrode array electrodes, here electrode 232, whenever handle member 112 is moved upward or downward by a user. FIGS. 5A–7E, described below, provide further details as to various mechanisms 500 for cleaning wire or wire-like electrodes 232 in the first electrode array 230, and for maintaining high resistance between the first and second electrode arrays 230, 240 even if some moisture is allowed to pool within the bottom interior of unit 100.

Figure 3:
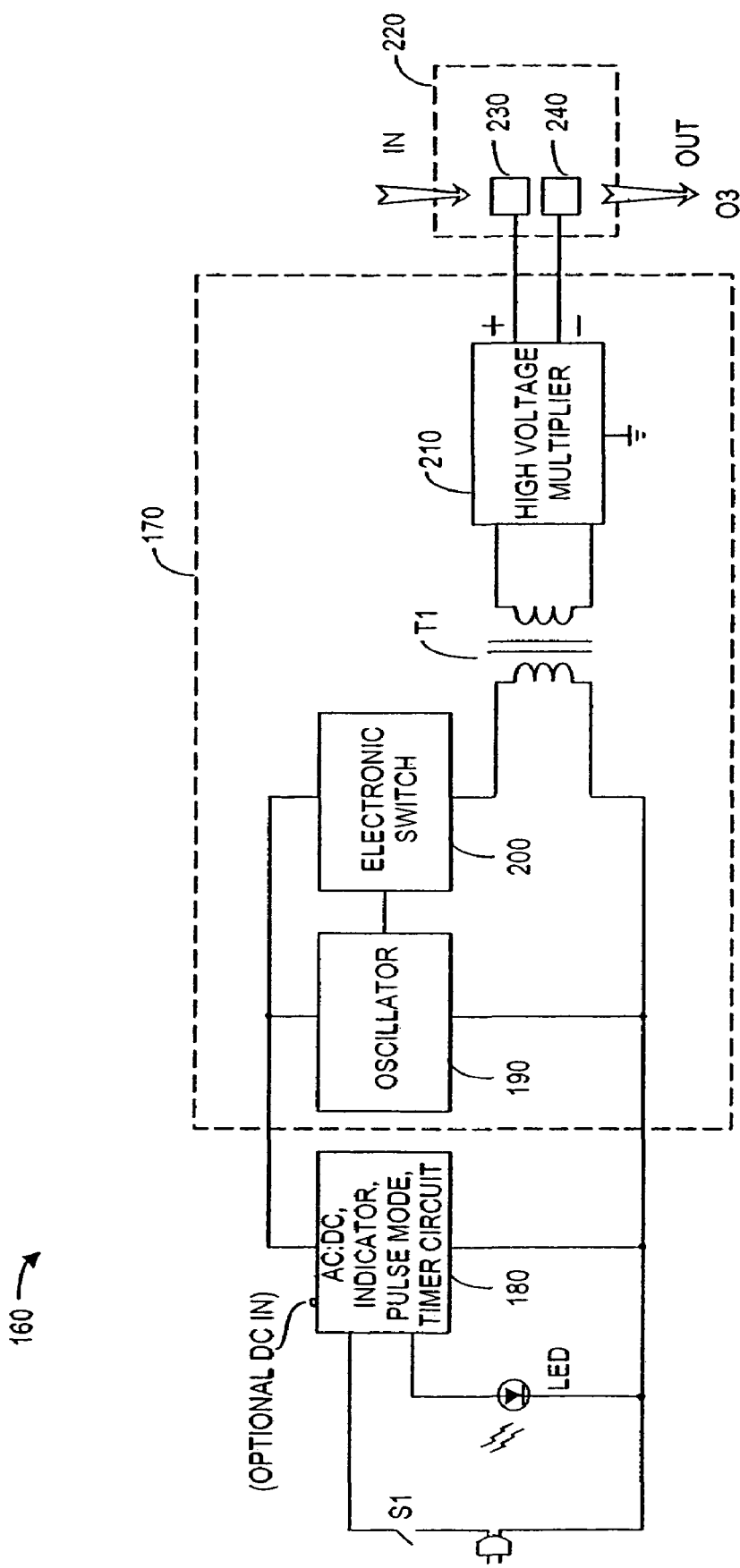
FIG. 3 is an electrical block diagram of the present invention.

The first and second arrays of electrodes are coupled in series between the output terminals of ion generating unit 160, as best seen in FIG. 3. The ability to lift handle 112 provides ready access to the electrodes comprising the electrode assembly, for purposes of cleaning and, if necessary, replacement.

The general shape of the invention shown in FIGS. 2A and 2B is provided for purpose of illustration. Other shapes can be employed without departing from the scope of the invention. The top-to-bottom height of an embodiment is perhaps 1 m, with a left-to-right width of perhaps 15 cm, and a front-to-back depth of perhaps 10 cm, although other dimensions and shapes can of course be used. A louvered construction provides ample inlet and outlet venting in an economical housing configuration. There need be no real distinction between vents 104 and 106, except its location relative to the second array electrodes, and indeed a common vent could be used. These vents serve to ensure that an adequate flow of ambient air can be drawn into or made available to the unit 100, and that an adequate flow of ionized air that includes safe amounts of $O_3$ flows out from unit 100.

As will be described, when unit 100 is energized with S1, high voltage output by ion generator 160 produces ions at the first electrode array, which ions are attracted to the second electrode array. The movement of the ions in an "IN" to "OUT" direction carries with it air molecules, thus electro kinetically producing an outflow of ionized air. The "IN" notation in FIGS. 2A and 2B denote the intake of ambient air with particulate matter 60. The "OUT" notation in the figures denotes the outflow of cleaned air substantially devoid of the particulate matter, which adheres electrostatically to the surface of the second array electrodes. In the process of generating the ionized air flow, safe amounts of ozone ($O_3$) are beneficially produced. It can be desired to provide the inner surface of housing 102 with an electrostatic shield to reduces detectable electromagnetic radiation. For example, a metal shield could be disposed within the housing, or portions of the interior of the housing could be coated with a metallic paint to reduce such radiation.

As best seen in FIG. 3, ion generating unit 160 includes a high voltage generator unit 170 and circuitry 180 for converting raw alternating voltage (e.g., 117 VAC) into direct current ("DC") voltage. Circuitry 180 preferably includes circuitry controlling the shape and/or duty cycle of the generator unit 170 output voltage (which control is altered with user switch S2 shown as 200). Circuitry 180 preferably also includes a pulse mode component, coupled to switch S3 (not shown), to temporarily provide a burst of increased output ozone. Circuitry 180 can also include a timer circuit and a visual indicator such as a light emitting diode ("LED"). The LED or other indicator (including, if desired, audible indicator) signals when ion generation is occurring. The timer can automatically halt generation of ions and/or ozone after some predetermined time, e.g., 30 minutes. indicator(s), and/or audible indicator(s).

As shown in FIG. 3, high voltage generator unit 170 preferably comprises a low voltage oscillator circuit 190 of perhaps 20 KHz frequency, that outputs low voltage pulses to an electronic switch 200, e.g., a thyristor or the like. Switch 200 switchably couples the low voltage pulses to the input winding of a step-up transformer T1. The secondary winding of T1 is coupled to a high voltage multiplier circuit 210 that outputs high voltage pulses. Preferably the circuitry and components comprising high voltage pulse generator 170 and circuit 180 are fabricated on a printed circuit board that is mounted within housing 102. If desired, external audio input (e.g., from a stereo tuner) could be suitably coupled to oscillator 190 to acoustically modulate the kinetic airflow produced by unit 160. The result would be an electrostatic loudspeaker, whose output air flow is audible to the human ear in accordance with the audio input signal. Further, the output air stream would still include ions and ozone.

Output pulses from high voltage generator 170 preferably are at least 10 KV peak-to-peak with an effective DC offset of perhaps half the peak-to-peak voltage, and have a frequency of perhaps 20 KHz. The pulse train output preferably has a duty cycle of perhaps 10%, which will promote battery lifetime. Of course, different peak-peak amplitudes, DC offsets, pulse train waveshapes, duty cycle, and/or repetition frequencies can instead be used. Indeed, a 100% pulse train (e.g., an essentially DC high voltage) can be used, albeit with shorter battery lifetime. Thus, generator unit 170 can be referred to as a high voltage pulse generator.

Frequency of oscillation is not especially critical but frequency of at least about 20 KHz is preferred as being inaudible to humans. If pets will be in the same room as the unit 100, it can be desired to utilize an even higher operating frequency, to prevent pet discomfort and/or howling by the pet. As noted with respect to FIGS. 5A–6E, to reduce likelihood of audible oscillations, it is desired to include at least one mechanism to clean the first electrode array 230 elements 232.

The output from high voltage pulse generator unit 170 is coupled to an electrode assembly 220 that comprises a first electrode array 230 and a second electrode array 240. Unit 170 functions as a DC:DC high voltage generator, and could be implemented using other circuitry and/or techniques to output high voltage pulses that are input to electrode assembly 220.

In the embodiment of FIG. 3, the positive output terminal of unit 170 is coupled to first electrode array 230, and the negative output terminal is coupled to second electrode array 240. This coupling polarity has been found to work well, including minimizing unwanted audible electrode vibration or hum. An electrostatic flow of air is created, going from the first electrode array towards the second electrode array. (This flow is denoted "OUT" in the figures) Accordingly electrode assembly 220 is mounted within transporter system 100 such that second electrode array 240 is closer to the OUT vents and first electrode array 230 is closer to the IN vents.

When voltage or pulses from high voltage pulse generator 170 are coupled across first and second electrode arrays 230 and 240, it is believed that a plasma-like field is created surrounding electrodes 232 in first array 230. This electric field ionizes the ambient air between the first and second electrode arrays and establishes an "OUT" airflow that moves towards the second array. It is understood that the IN flow enters via vent(s) 104, and that the OUT flow exits via vent(s) 106.

It is believed that ozone and ions are generated simultaneously by the first array electrode(s) 232, essentially as a function of the potential from generator 170 coupled to the first array. Ozone generation can be increased or decreased by increasing or decreasing the potential at the first array. Coupling an opposite polarity potential to the second array electrode(s) 242 essentially accelerates the motion of ions generated at the first array, producing the air flow denoted as "OUT" in the figures. As the ions move toward the second array, it is believed that it pushes or moves air molecules toward the second array. The relative velocity of this motion can be increased by decreasing the potential at the second array relative to the potential at the first array.

For example, if +10 KV were applied to the first array electrode(s), and no potential were applied to the second array electrode(s), a cloud of ions (whose net charge is positive) would form adjacent the first electrode array. Further, the relatively high 10 KV potential would generate substantial ozone. By coupling a relatively negative potential to the second array electrode(s), the velocity of the air mass moved by the net emitted ions increases, as momentum of the moving ions is conserved.

On the other hand, if it were desired to maintain the same effective outflow (OUT) velocity but to generate less ozone, the exemplary 10 KV potential could be divided between the electrode arrays. For example, generator 170 could provide +4 KV (or some other value) to the first array electrode(s) and −KV (or some other value) to the second array electrode(s). In this example, it is understood that the +4 KV and the −6 KV are measured relative to ground. Understandably it is desired that the unit 100 operate to output safe amounts of ozone. Accordingly, the high voltage is preferably fractionalized with about +4 KV applied to the first array electrode(s) and about −6 KV applied to the second array electrodes.

As noted, outflow (OUT) preferably includes safe amounts of $O_3$ that can destroy or at least substantially alter bacteria, germs, and other living (or quasi-living) matter subjected to the outflow. Thus, when switch S1 is closed and battery B1 has sufficient operating potential, pulses from high voltage pulse generator unit 170 create an outflow (OUT) of ionized air and $O_3$. When switch S1 is closed, LED will visually signal when ionization is occurring.

Preferably operating parameters of unit 100 are set during manufacture and are not user-adjustable. For example, increasing the peak-to-peak output voltage and/or duty cycle in the high voltage pulses generated by unit 170 can increase air flowrate, ion content, and ozone content. In an embodiment, output flowrate is about 200 feet/minute, ion content is about 2,000,000/cc and ozone content is about 40 ppb (over ambient) to perhaps 2,000 ppb (over ambient). Decreasing the R2/R1 ratio below about 20:1 will decrease flow rate, as will decreasing the peak-to-peak voltage and/or duty cycle of the high voltage pulses coupled between the first and second electrode arrays.

In practice, unit 100 is placed in a room and connected to an appropriate source of operating potential, typically 117 VAC. With switch S1 energized, ionization unit 160 emits ionized air and preferably some ozone ($O_3$) via outlet vents 150. The air flow, coupled with the ions and ozone freshens the air in the room, and the ozone can beneficially destroy or at least diminish the undesired effects of certain odors, bacteria, germs, and the like. The air flow is indeed electro-kinetically produced, in that there are no intentionally moving parts within unit 100. (As noted, some mechanical vibration can occur within the electrodes.) As will be described with respect to FIG. 4A, it is desirable that unit 100 actually output a net surplus of negative ions, as these ions are deemed more beneficial to health than are positive ions.

Having described various aspects of the invention in general, a variety of embodiments of electrode assembly 220 will now be described. In the various embodiments, electrode assembly 220 will comprise a first array 230 of at least one electrode 232, and will further comprise a second array 240 of preferably at least one electrode 242. Understandably material(s) for electrodes 232 and 242 should conduct electricity, be resilient to corrosive effects from the application of high voltage, yet be strong enough to be cleaned.

In the various electrode assemblies to be described herein, electrode(s) 232 in the first electrode array 230 are preferably fabricated from tungsten. Tungsten is sufficiently robust to withstand cleaning, has a high melting point to retard breakdown due to ionization, and has a rough exterior surface that seems to promote efficient ionization. On the other hand, electrodes 242 preferably will have a highly polished exterior surface to minimize unwanted point-to-point radiation. As such, electrodes 242 preferably are fabricated from stainless steel, brass, among other materials. The polished surface of electrodes 232 also promotes ease of electrode cleaning.

In contrast to the prior art electrodes disclosed by Lee, discussed supra, electrodes 232 and 242, used in unit 100 are lightweight, easy to fabricate, and appropriate for mass production. Further, electrodes 232 and 242 described herein promote more efficient generation of ionized air, and production of safe amounts of ozone, $O_3$.

In unit 100, a high voltage pulse generator 170 is coupled between the first electrode array 230 and the second electrode array 240. The high voltage pulses produce a flow of ionized air that travels in the direction from the first array towards the second array (indicated herein by hollow arrows denoted "OUT"). As such, electrode(s) 232 can be referred to as an emitting electrode, and electrodes 242 can be referred to as collector electrodes. This outflow advantageously contains safe amounts of $O_3$, and exits unit 100 from vent(s) 106.

It is preferred that the positive output terminal or port of the high voltage pulse generator be coupled to electrodes 232, and that the negative output terminal or port be coupled to electrodes 242. It is believed that the net polarity of the emitted ions is positive, e.g., more positive ions than negative ions are emitted. In any event, the preferred electrode assembly electrical coupling minimizes audible hum from electrodes 232 contrasted with reverse polarity (e.g., interchanging the positive and negative output port connections).

However, while generation of positive ions is conducive to a relatively silent air flow, from a health standpoint, it is desired that the output air flow be richer in negative ions, not positive ions. It is noted that in some embodiments, however, one port (preferably the negative port) of the high voltage pulse generator can in fact be the ambient air. Thus, electrodes in the second array need not be connected to the high voltage pulse generator using wire. Nonetheless, there will be an "effective connection" between the second array electrodes and one output port of the high voltage pulse generator, in this instance, via ambient air.

Figure 4A:
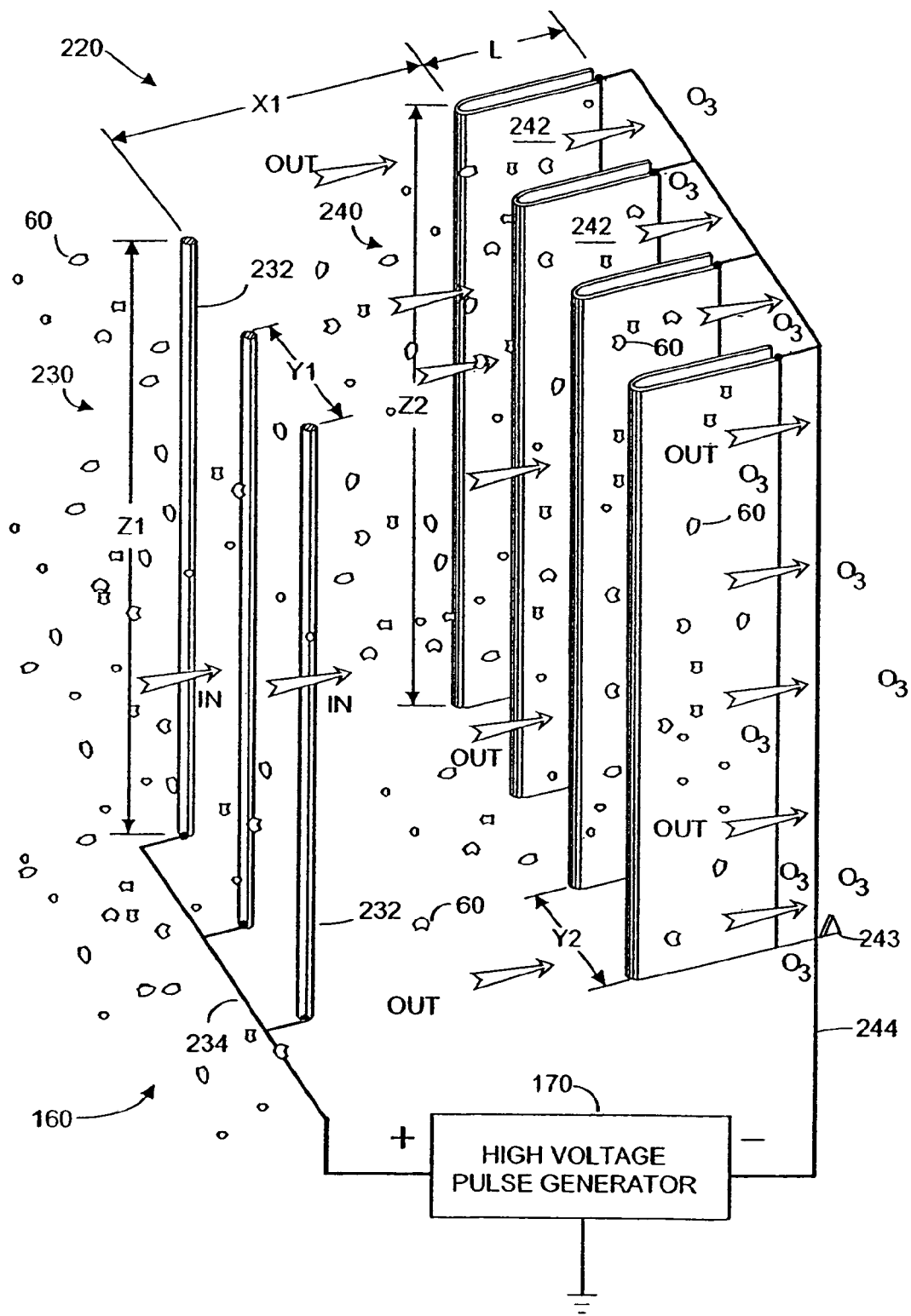
FIG. 4A is a perspective block diagram showing a first embodiment for an electrode assembly, according to the present invention.
Figure 4B:
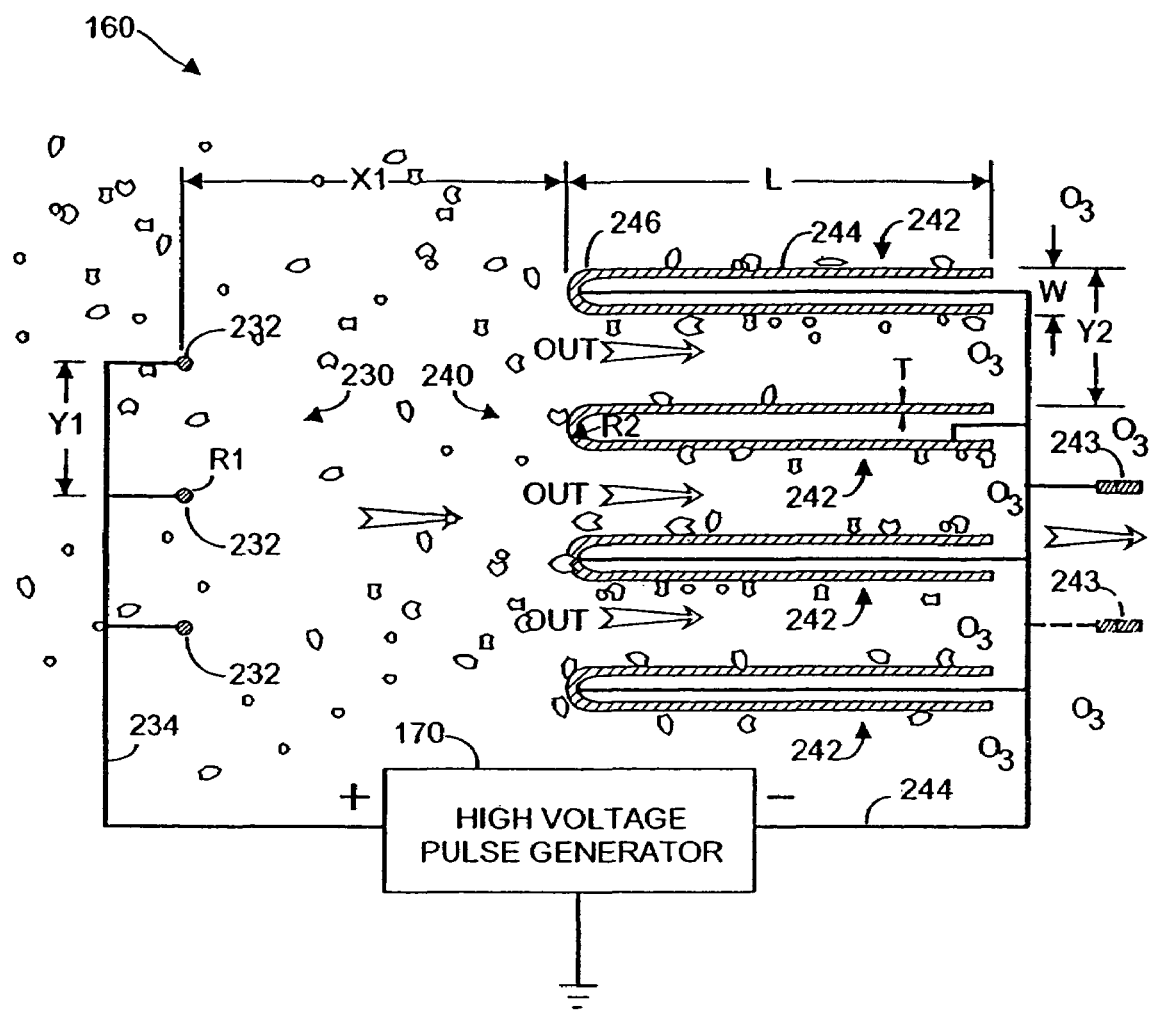
FIG. 4B is a plan block diagram of the embodiment of FIG. 4A.

Turning now to the embodiments of FIGS. 4A and 4B, electrode assembly 220 comprises a first array 230 of wire electrodes 232, and a second array 240 of generally "U"-shaped electrodes 242. The number N1 of electrodes comprising the first array can differ by one relative to the number N2 of electrodes comprising the second array. In many of the embodiments shown, N2>N1. However, if desired, in FIG. 4A, addition first electrodes 232 could be added at the out ends of array 230 such that N1>N2, e.g., five electrodes 232 compared to four electrodes 242.

Electrodes 232 are preferably lengths of tungsten wire, whereas electrodes 242 are formed from sheet metal, preferably stainless steel, although brass or other sheet metal could be used. The sheet metal is readily formed to define side regions 244 and bulbous nose region 246 for hollow elongated "U" shaped electrodes 242. While FIG. 4A depicts four electrodes 242 in second array 240 and three electrodes 232 in first array 230, as noted, other numbers of electrodes in each array could be used, preferably retaining a symmetrically staggered configuration as shown. It is seen in FIG. 4A that while particulate matter 60 is present in the incoming (IN) air, the outflow (OUT) air is substantially devoid of particulate matter, which adheres to the preferably large surface area provided by the second array electrodes (see FIG. 4B).

As best seen in FIG. 4B, the spaced-apart configuration between the arrays is staggered such that each first array electrode 232 is substantially equidistant from two second array electrodes 242. This symmetrical staggering has been found to be an especially efficient electrode placement. Preferably the staggering geometry is symmetrical in that adjacent electrodes 232 or adjacent electrodes 242 are spaced-apart a constant distance, Y1 and Y2 respectively. However, a non-symmetrical configuration could also be used, although ion emission and air flow would likely be diminished. Also, it is understood that the number of electrodes 232 and 242 can differ from what is shown.

In FIG. 4A, typically dimensions are as follows: diameter of electrodes 232 is about 0.08 mm, distances Y1 and Y2 are each about 16 mm, distance X1 is about 16 mm, distance L is about 20 mm, and electrode heights Z1 and Z2 are each about 1 m. The width W of electrodes 242 is about 4 mm, and the thickness of the material from which electrodes 242 are formed is about 0.5 mm. Of course other dimensions and shapes could be used. Electrodes 232 can be small in diameter to help establish a desired high voltage field. On the other hand, it is anticipated that electrodes 232 (as well as electrodes 242) will be sufficiently robust regardless of diameter to withstand occasional cleaning.

Electrodes 232 in first array 230 are coupled by a conductor 234 to a first (preferably positive) output port of high voltage pulse generator 170, and electrodes 242 in second array 240 are coupled by a conductor 244 to a second (preferably negative) output port of generator 170. As will be appreciated by those of skill in the art, other locations on the various electrodes can be used to make electrical connection to conductors 234 or 244. Thus, by way of example FIG. 4B depicts conductor 244 making connection with some electrodes 242 internal to bulbous end 246, while other electrodes 242 make electrical connection to conductor 244 elsewhere on the electrode. Electrical connection to the various electrodes 242 could also be made on the electrode external surface providing no substantial impairment of the outflow air stream results.

To facilitate removing the electrode assembly from unit 100 (as shown in FIG. 2B), the lower end of the various electrodes can be configured to fit against mating portions of wire or other conductors 234 or 244. For example, "cup-like" members can be affixed to conductors 234 and 244 into which the free ends of the various electrodes fit when electrode array 220 is inserted completely into housing 102 of unit 100.

The ratio of the effective electric field emanating area of electrode 232 to the nearest effective area of electrodes 242 is at least about 15:1, and preferably is at least 20:1. Thus, in the embodiment of FIG. 4A and FIG. 4B, the ratio R2/R1≈2 mm/0.04 mm≈50:1. However, other ratios may be used without departing from the scope of the invention.

In this and the other embodiments to be described herein, ionization appears to occur at the smaller electrode(s) 232 in the first electrode array 230, with ozone production occurring as a function of high voltage arcing. For example, increasing the peak-to-peak voltage amplitude and/or duty cycle of the pulses from the high voltage pulse generator 170 can increase ozone content in the output flow of ionized air. If desired, user-control S2 can be used to somewhat vary ozone content by varying (in a safe manner) amplitude and/or duty cycle. Specific circuitry for achieving such control is known in the art and need not be described in detail herein.

Note the inclusion in FIGS. 4A and 4B of at least one output controlling electrode 243, preferably electrically coupled to the same potential as the second array 240 electrodes. Electrode 242 preferably defines a pointed shape in side profile, e.g., a triangle. The sharp point on electrode(s) 243 causes generation of substantial negative ions (since the electrode is coupled to relatively negative high potential). These negative ions neutralize excess positive ions otherwise present in the output air flow, such that the OUT flow has a net negative charge. Electrode(s) 243 preferably are stainless steel, copper, or other conductor, and are perhaps 20 mm high and about 12 mm wide at the base.

Another advantage of including pointed electrodes 243 is that they can be stationarily mounted within the housing of unit 100, and thus are not readily reached by human hands when cleaning the unit. Were it otherwise, the sharp point on electrode(s) 243 could easily cause cuts. The inclusion of one electrode 243 has been found sufficient to provide a sufficient number of output negative ions, but more such electrodes can be included.

Figure 4C:
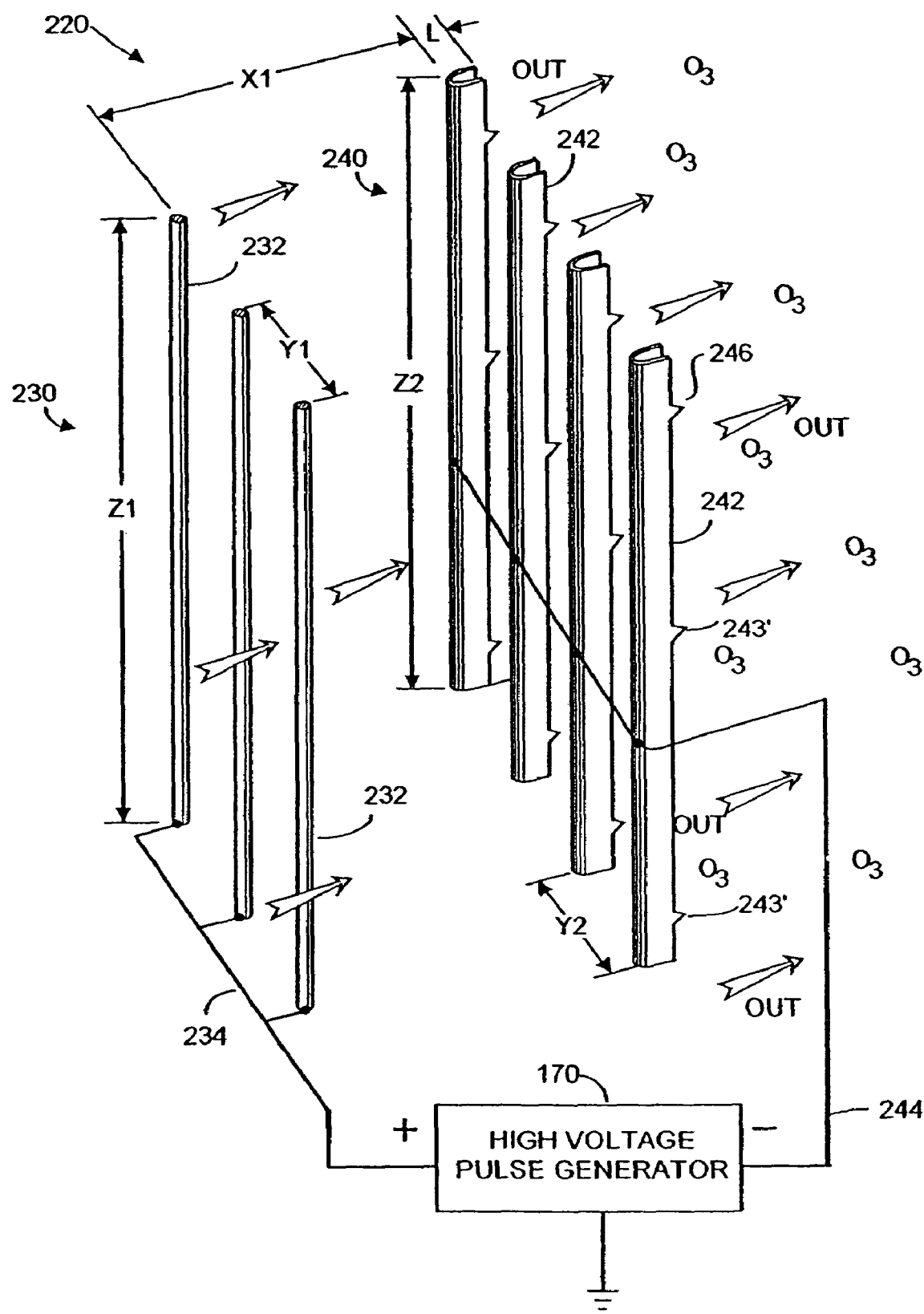
FIG. 4C is a perspective block diagram showing a second embodiment for an electrode assembly, according to the present invention.

In the embodiment of FIGS. 4A and 4C, each "U"-shaped electrode 242 has two trailing edges that promote efficient kinetic transport of the outflow of ionized air and $O_3$. Note the inclusion on at least one portion of a trailing edge of a pointed electrode region 243'. Electrode region 243' helps promote output of negative ions, in the same fashion as was described with respect to FIGS. 4A and 4B. Note, however, the higher likelihood of a user cutting himself or herself when wiping electrodes 242 with a cloth or the like to remove particulate matter deposited thereon. In FIG. 4C and the figures to follow, the particulate matter is omitted for ease of illustration. However, from what was shown in FIGS. 2A–4B, particulate matter will be present in the incoming air, and will be substantially absent from the outgoing air. As has been described, particulate matter 60 typically will be electrostatically precipitated upon the surface area of electrodes 242. As indicated by FIG. 4C, it is relatively unimportant where on an electrode array electrical connection is made. Thus, first array electrodes 232 are shown connected together at its bottom regions, whereas second array electrodes 242 are shown connected together in its middle regions. Both arrays can be connected together in more than one region, e.g., at the top and at the bottom. When the wire or strips or other inter-connecting mechanisms are located at the top or bottom or periphery of the second array electrodes 242, obstruction of the stream air movement is minimized.

Figure 4D:
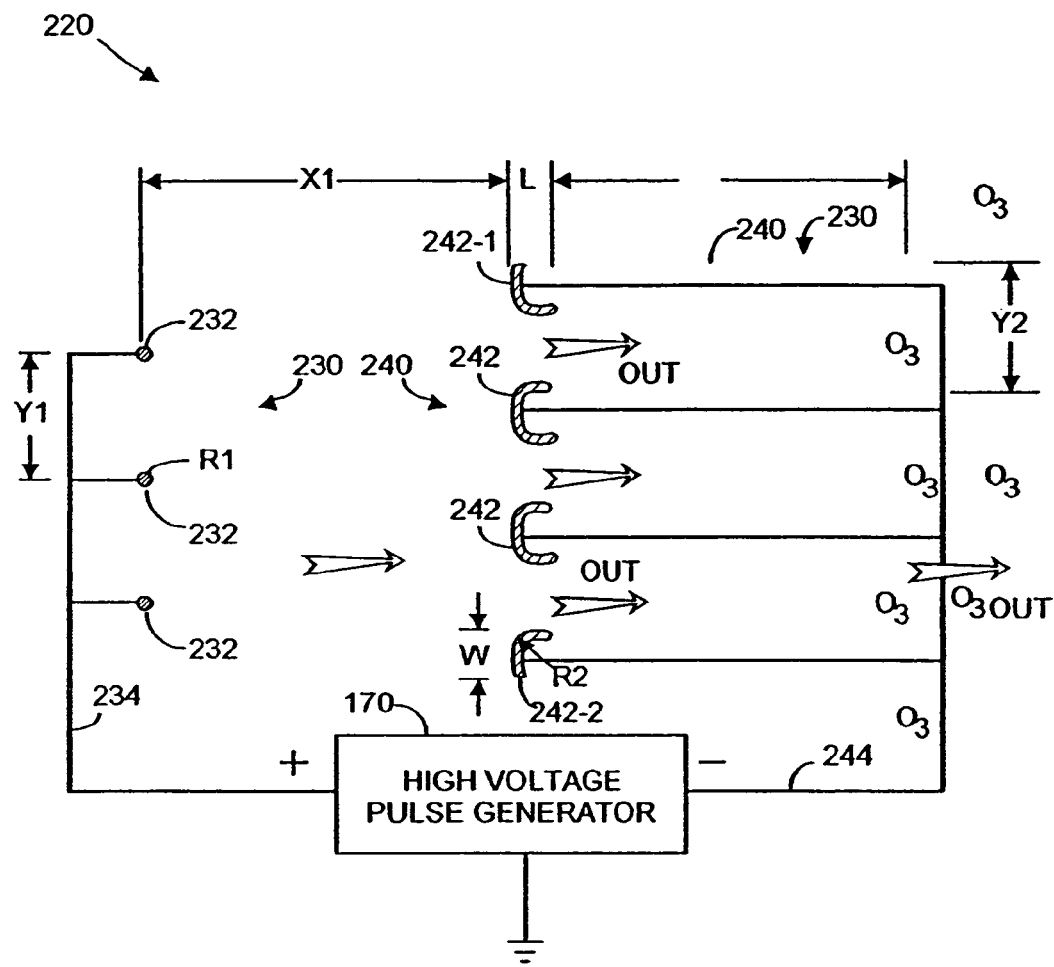
FIG. 4D is a plan block diagram of a modified version of the embodiment of FIG. 4C.

Note that the embodiments of FIGS. 4C and 4D depict somewhat truncated versions of electrodes 242. Whereas dimension L in the embodiment of FIG. 4B was about 20 mm, in FIG. 4C, L has been shortened to about 8 mm. Other dimensions in FIG. 4C preferably are similar to those stated for FIGS. 4A and 4B. In FIGS. 4C and 4D, the inclusion of point-like regions 243 on the trailing edge of electrodes 242 seems to promote more efficient generation of ionized air flow. It will be appreciated that the configuration of second electrode array 240 in FIG. 4C can be more robust than the configuration of FIGS. 4A and 4B, by virtue of the shorter trailing edge geometry. As noted earlier, a symmetrical staggered geometry for the first and second electrode arrays is preferred for the configuration of FIG. 4C.

In the embodiment of FIG. 4D, the outermost second electrodes, denoted 242-1 and 242-2, have substantially no outermost trailing edges. Dimension L in FIG. 4D is preferably about 3 mm, and other dimensions can be as stated for the configuration of FIGS. 4A and 4B. Again, the R2/R1 ratio for the embodiment of FIG. 4D preferably exceeds about 20:1.

Figure 4E:
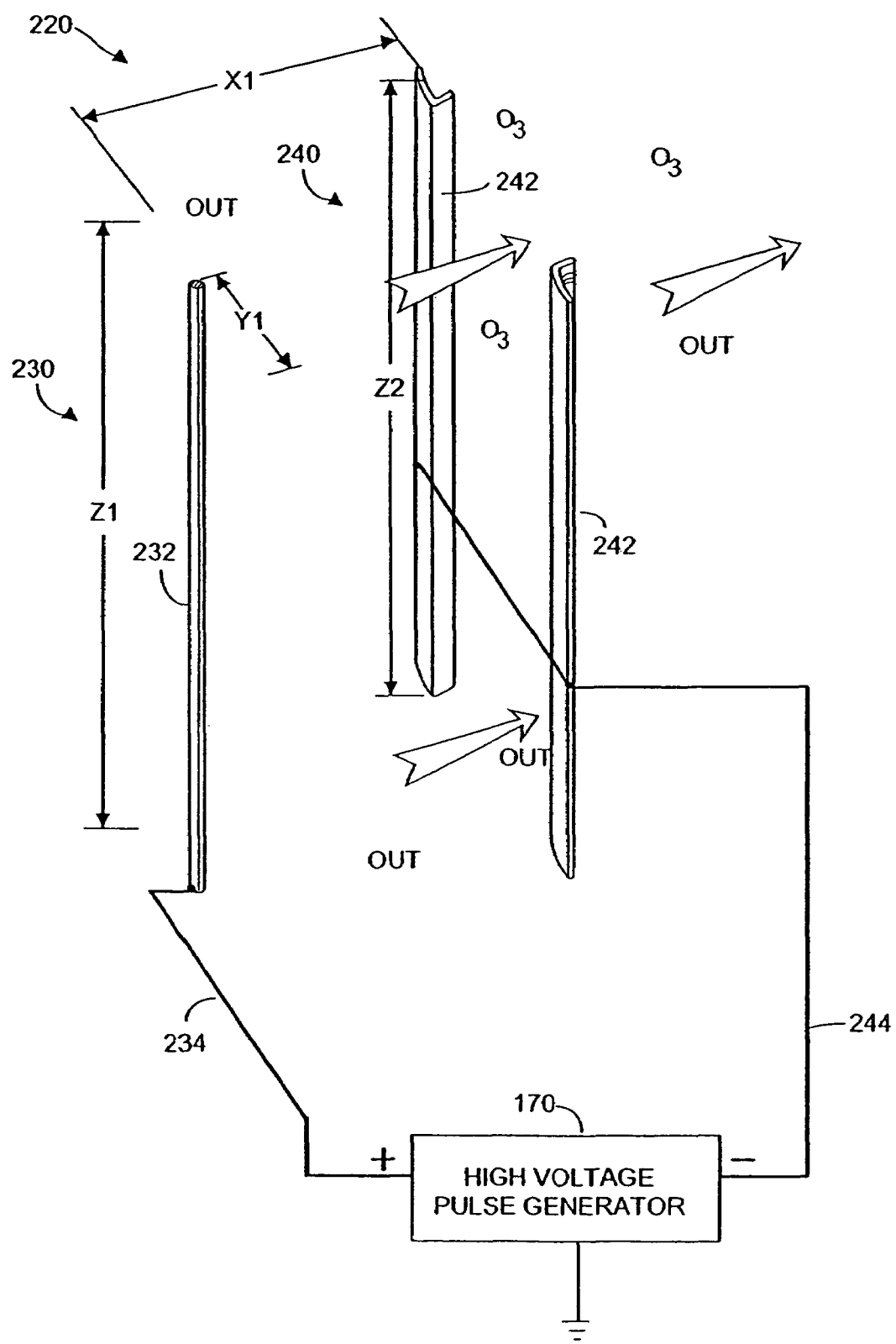
FIG. 4E is a perspective block diagram showing a third embodiment for an electrode assembly, according to the present invention.
Figure 4F:
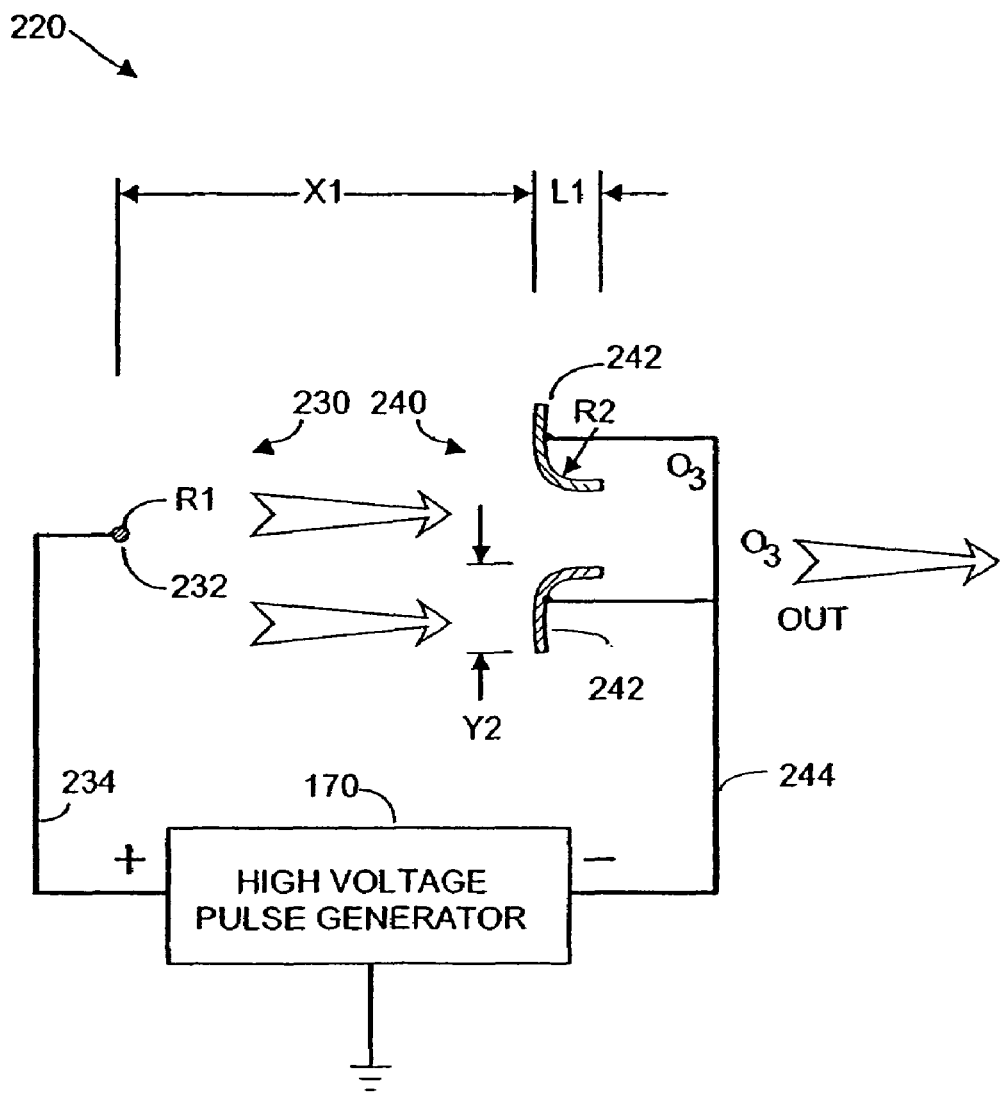
FIG. 4F is a plan block diagram of the embodiment of FIG. 4E.

FIGS. 4E and 4F depict another embodiment of electrode assembly 220, in which the first electrode array comprises a single wire electrode 232, and the second electrode array comprises a single pair of curved "L"-shaped electrodes 242, in cross-section. Typical dimensions, where different than what has been stated for earlier-described embodiments, are X1≈12 mm, Y1≈6 mm, Y2≈5 mm, and L1≈3 mm. The effective R2/R1 ratio is again greater than about 20:1. The fewer electrodes comprising assembly 220 in FIGS. 4E and 4F promote economy of construction, and ease of cleaning, although more than one electrode 232, and more than two electrodes 242 could of course be employed. This embodiment again incorporates the staggered symmetry described earlier, in which electrode 232 is equidistant from two electrodes 242.

Figure 5A:
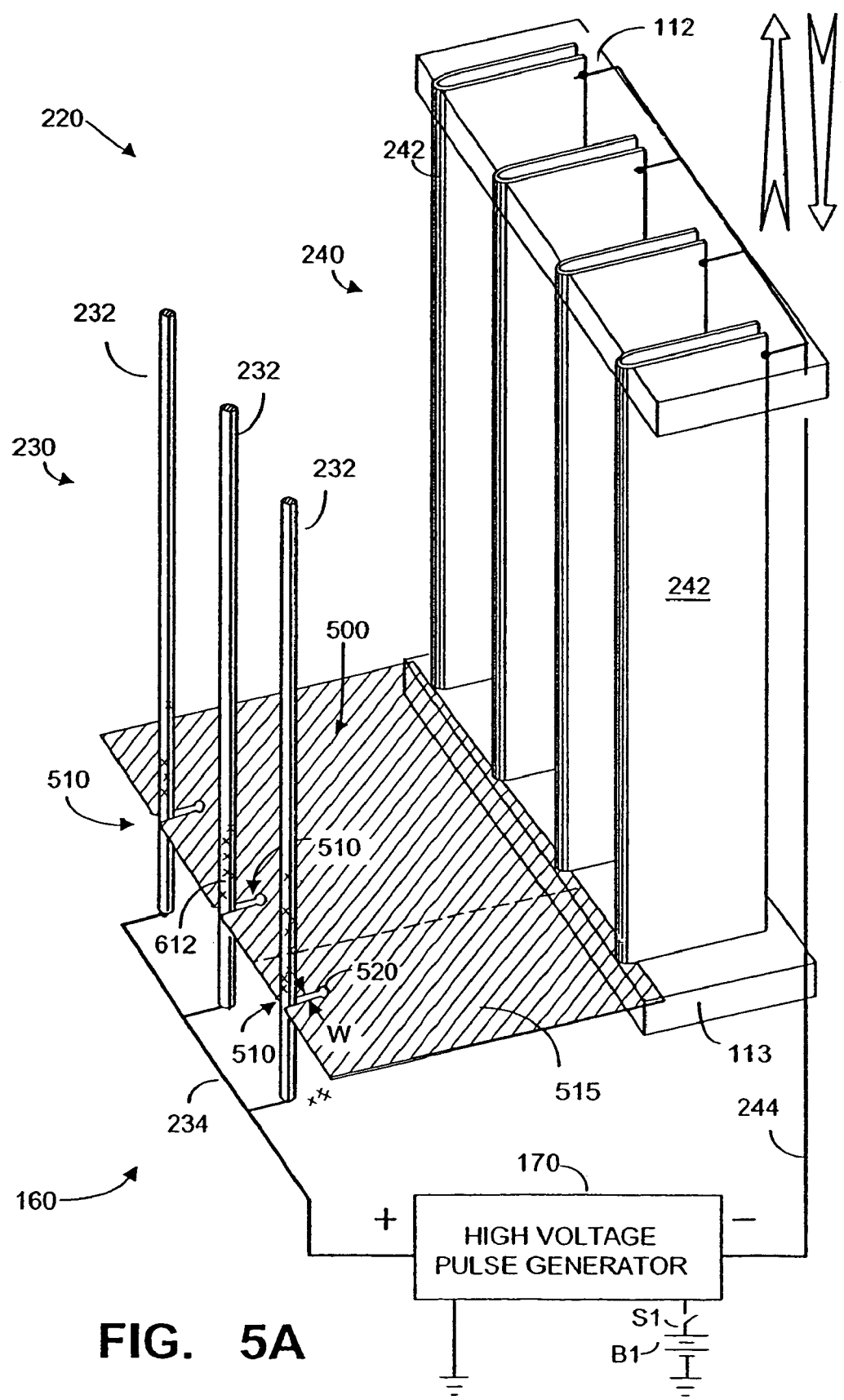
FIG. 5A is a perspective view of an electrode assembly depicting a first embodiment of a mechanism to clean first electrode array electrodes, according to the present invention.
Figure 5B:
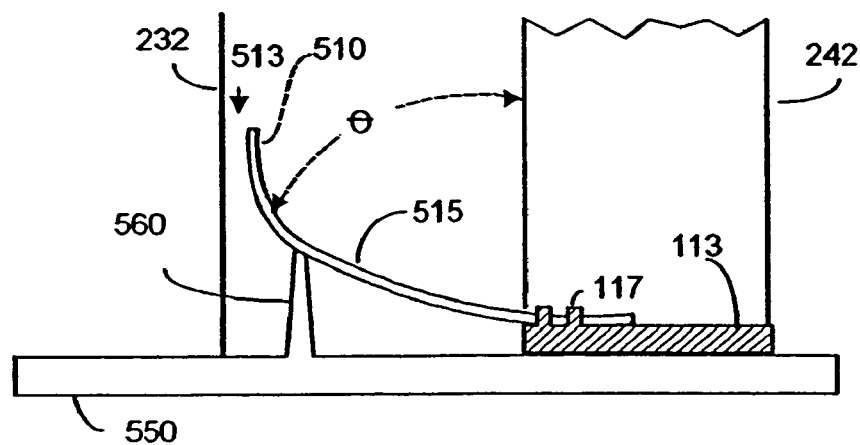
FIG. 5B is a side view depicting an electrode cleaning mechanism as shown in FIG. 5A, according to the present invention.
Figure 5C:
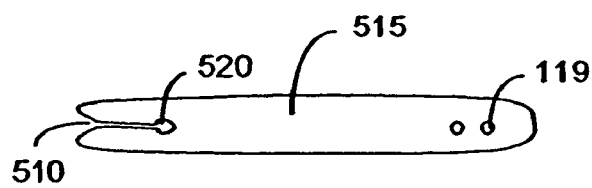
FIG. 5C is a plan view of the electrode cleaning mechanism shown in FIG. 5B, according to the present invention.

Turning now to FIG. 5A, a first embodiment of an electrode cleaning mechanism 500 is depicted. In the embodiment shown, mechanism 500 comprises a flexible sheet 515 of insulating material such as a polyester or polyamide film, such as Mylar® or Kapton®, available from DuPont, or other high voltage, high temperature breakdown resistant material, having sheet thickness of perhaps 0.1 mm or so. Sheet 500 is attached at one end to the base or other mechanism 113 secured to the lower end of second electrode array 240. Sheet 500 extends or projects out from base 113 towards and beyond the location of first electrode array 230 electrodes 232. The overall projection length of sheet 500 in FIG. 5A will be sufficiently long to span the distance between base 113 of the second array 240 and the location of electrodes 232 in the first array 230. This span distance will depend upon the electrode array configuration but typically will be a few inches or so. Preferably the distal edge of cleaning mechanism 500 will extend slightly beyond the location of electrodes 232, perhaps 0.5" beyond. As shown in FIGS. 5A and 5C, the distal edge, e.g., edge closest to electrodes 232, of cleaning mechanism 500 is formed with a slot 510 corresponding to the location of an electrode 232. Preferably the inward end of the slot forms a small circle 520, which can promote flexibility.

The configuration of the sheets or strips 515 and slots 510 of electrode cleaning mechanism 500 is such that each wire or wire-like electrode 232 in the first electrode array 230 fits snugly and frictionally within a corresponding slot 510. As indicated by FIG. 5A and shown in FIG. 5C, instead of a single sheet that includes a plurality of slots 510, one can provide individual sheets or strips 515 of cleaning mechanism 500, the distal end of each strip having a slot 510 that will surround an associated wire electrode 232. Note in FIGS. 5B and 5C that cleaning mechanism 500 or sheets or strips 515 are formed with holes 119 that can attach to pegs 117 that project from the base portion 113 of the second electrode array 240. Of course other attachment mechanisms could be used including, for example, glue, double-sided tape, inserting the array 240-facing edge of the sheet into a horizontal slot or ledge in base member 113, and so forth.

FIG. 5A shows second electrode array 240 in the process of being moved upward, perhaps by a user intending to remove array 240 to remove particulate matter from the surfaces of its electrodes 242. Note that as array 240 moves up (or down), cleaning mechanism 500 for sheets or strips 515 also move up (or down). This vertical movement of array 240 produces a vertical movement in cleaning mechanism 500 or sheets or strips 515, which causes the outer surface of electrodes 232 to scrape against the inner surfaces of an associated slot 510. FIG. 5A, for example, shows debris and other deposits 612 (indicated by x's) on wires 232 above cleaning mechanism 500. As array 240 and cleaning mechanism 500 move upward, debris 612 is scraped off the wire electrodes, and falls downward (to be vaporized or collected as particulate matter when unit 100 is again reassembled and turned-on). Thus, the outer surface of electrodes 232 below cleaning mechanism 500 in FIG. 5A is shown as being cleaner than the surface of the same electrodes above cleaning mechanism 500, where scraping action has yet to occur.

A user hearing that excess noise or humming emanates from unit 100 might simply turn the unit off, and slide array 240 (and thus cleaning mechanism 500 or sheets or strips 515) up and down (as indicated by the up/down arrows in FIG. 5A) to scrape the wire electrodes in the first electrode array. This technique does not damage the wire electrodes, and allows the user to clean as required.

As noted earlier, a user can remove second electrode array 240 for cleaning (thus also removing cleaning mechanism 500, which will have scraped electrodes 232 on its upward vertical path). If the user cleans electrodes 242 with water and returns second array 240 to unit 100 without first completely drying the array 240, moisture might form on the upper surface of a horizontally disposed member 550 within unit 100. Thus, as shown in FIG. 5B, it is preferred that an upwardly projecting vane 560 be disposed near the base of each electrode 232 such that when array 240 is fully inserted into unit 100, the distal portion of cleaning mechanism 500 or preferably sheets or strips 515 deflect upward. While cleaning mechanism 500 or sheets or strips 515 nominally will define an angle θ of about 90°, as base 113 becomes fully inserted into unit 100, the angle θ will increase, approaching 0°, e.g., the sheet is extending almost vertically upward. If desired, a portion of cleaning mechanism 500 or sheets or strips 515 can be made stiffer by laminating two or more layers of suitable film of MYLAR or other material identified above. For example, the distal tip of strip 515 in FIG. 5B might be one layer thick, whereas the half or so of the strip length nearest electrode 242 might be stiffened with an extra layer or two of film such as MYLAR or other material identified above.

The inclusion of a projecting vane 560 in the configuration of FIG. 5B advantageously disrupted physical contact between cleaning mechanism 500 or sheets or strips 515 and electrodes 232, thus tending to preserve a high ohmic impedance between the first and second electrode arrays 230, 240. The embodiment of FIGS. 5A–5D advantageously serves to pivot cleaning mechanism 500 or sheets or strips 515 upward, essentially parallel to electrodes 232, to help maintain a high impedance between the first and second electrode arrays. Note the creation of an air gap 513 resulting from the upward deflection of the slit distal tip of the cleaning mechanism 500 or the sheets or strips 515 in FIG. 5B.

Figure 6A:
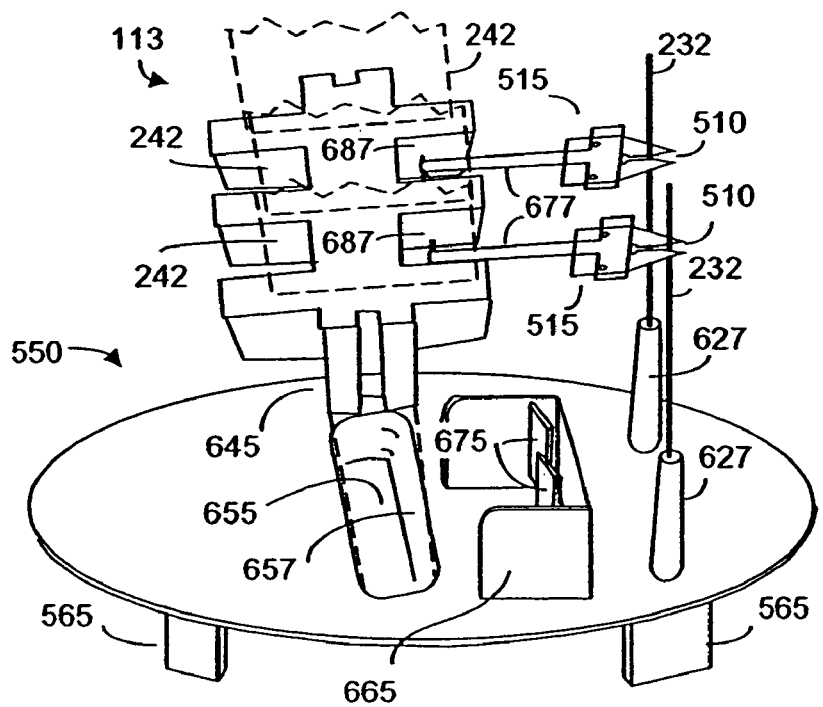
FIG. 6A is a perspective view of a pivotable electrode cleaning mechanism, according to the present invention.

In FIG. 6A, the lower edges of second array electrodes 242 are retained by a base member 113 from which project arms 677, which can pivot about pivot axle 687. Preferably axle 687 biases arms 677 into a horizontal disposition, e.g., such that θ≈90°. Arms 645 project from the longitudinal axis of base member 113 to help member 113 align itself within an opening 655 formed in member 550, described below. Preferably base member 113 and arms 677 are formed from a material that exhibits high voltage breakdown and can withstand high temperature. Ceramic is a preferred material (if cost and weight were not considered), but certain plastics could also be used. The unattached tip of each arm 677 terminates in a sheets or strips 515 of polyester or polyamide film such as Mylar®, Kapton®, or a similar material, whose distal tip terminates in a slot 510. It is seen that the pivotable arms 677 and sheets or strips 515 are disposed such that each slot 510 will self-align with a wire or wire-like electrode 232 in first array 230. Electrodes 232 preferably extend from pylons 627 on a base member 550 that extends from legs 565 from the internal bottom of the housing of the transporter-conditioner unit. To further help maintain high impedance between the first and second electrode arrays, base member 550 preferably includes a barrier wall 665 and upwardly extending vanes 675. Vanes 675, pylons 627, and barrier wall 665 extend upward perhaps an inch or so, depending upon the configuration of the two electrodes and can be formed integrally, e.g., by casting, from a material that exhibits high voltage breakdown and can withstand high temperature, such as ceramic, or certain plastics for example.

Figure 6B:
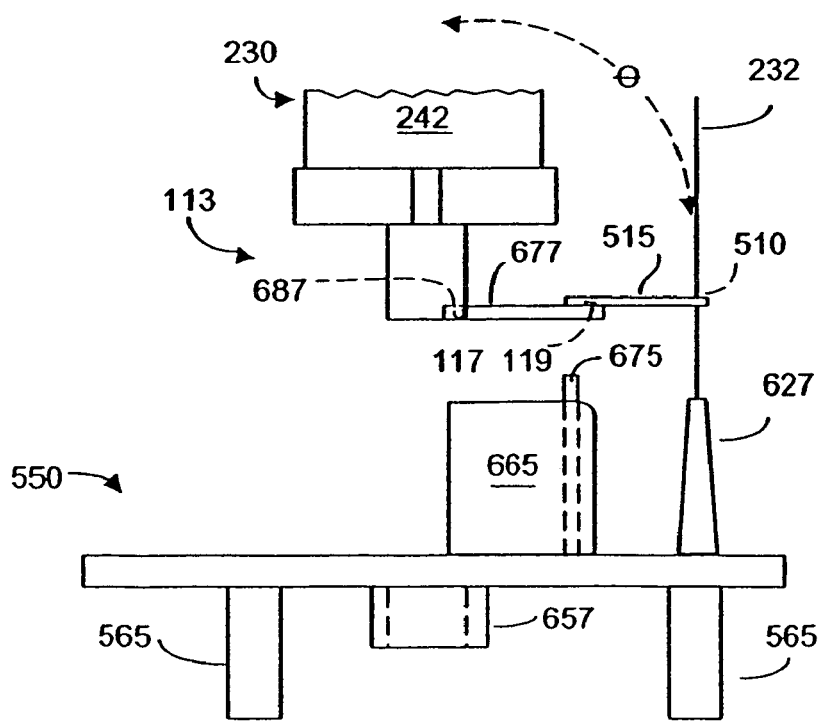
FIGS. 6B–6D depicts the cleaning mechanism of FIG. 6A in various positions, according to the present invention.

As best seen in FIG. 6A, base member 550 includes an opening 655 sized to receive the lower portion of second electrode array base member 113. In FIGS. 6A and 6B, arms 677 and sheet material 515 are shown pivoting from base member 113 about axis 687 at an angle θ≈90°. In this disposition, an electrode 232 will be within the slot 510 formed at the distal tip of each sheet material member 515.

Assume that a user had removed second electrode array 240 completely from the transporter-conditioner unit for cleaning, and that FIG. 6A and 6B depict array 240 being reinserted into the unit. The coiled spring or other bias mechanism associated with pivot axle 687 will urge arms 677 into an approximate θ≈90° orientation as the user inserts array 240 into unit 100. Side projections 645 help base member 113 align properly such that each wire or wire-like electrode 232 is caught within the slot 510 of a sheet or strip 515 on an arm 677. As the user slides array 240 down into unit 100, there will be a scraping action between the portions of sheets or strips 515 on either side of a slot 510, and the outer surface of an electrode 232 that is essentially captured within the slot. This friction will help remove debris or deposits that can have formed on the surface of electrodes 232. The user can slide array 240 up and down the further promote the removal of debris or deposits from elements 232.

Figure 6C:
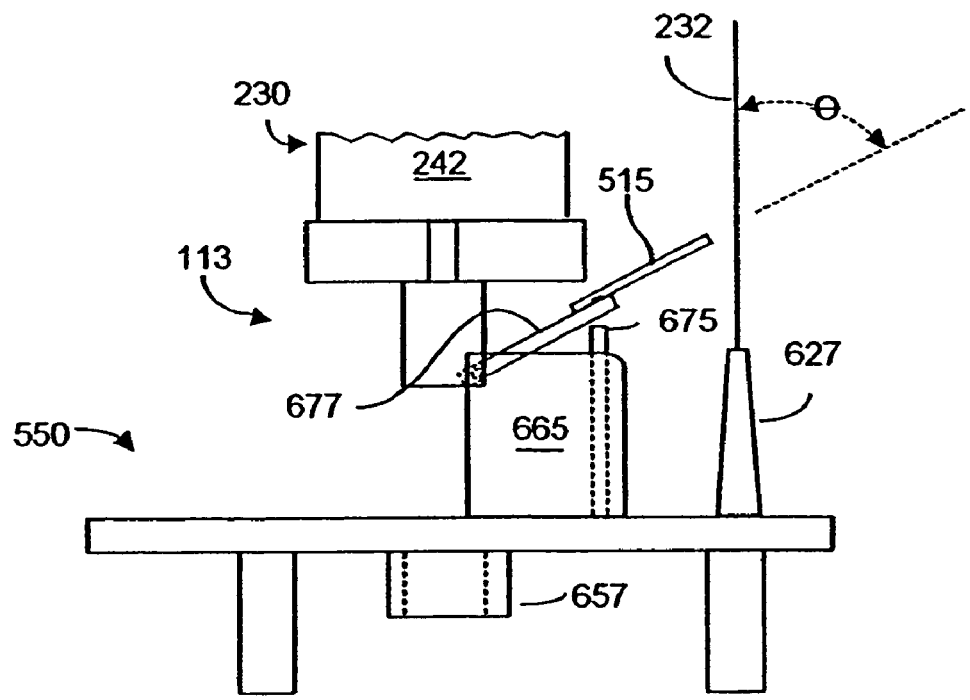

In FIG. 6C the user slid array 240 down almost entirely into unit 100. In the embodiment shown, when the lowest portion of base member 232 is perhaps an inch or so above the planar surface of member 550, the upward edge of a vane 675 will strike the a lower surface region of a projection arm 677. The result will be to pivot arm 677 and the attached slit-containing sheets or strips 515 about axle 687 such that the angle θ decreases. In the disposition shown in FIG. 6C, θ≈45° and slit-contact with an associated electrode 232 is no longer made.

Figure 6D:
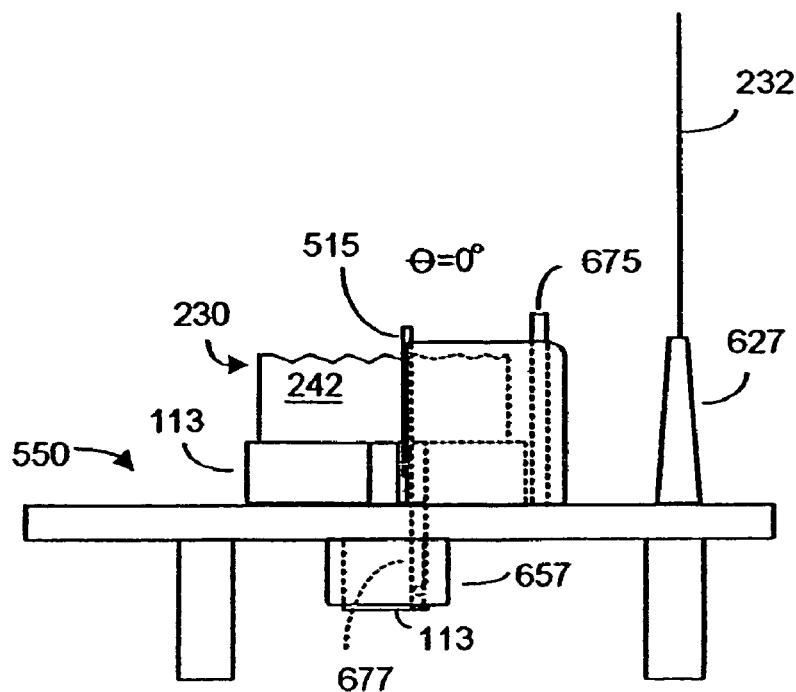

In FIG. 6D, the user has firmly urged array 240 fully downward into transporter-conditioner unit 100. In this disposition, as the projecting bottommost portion of member 113 begins to enter opening 655 in base member 550 (see FIG. 6A), contact between the inner wall 657 portion of member 550 urges each arm 677 to pivot fully upward, e.g., θ≈0°. Thus in the fully inserted disposition shown in FIG. 6D, each slit electrode cleaning member 515 is rotated upward parallel to its associated electrode 232. As such, neither arm 677 nor member 515 will decrease impedance between first and second electrode arrays 230, 240. Further, the presence of vanes 675 and barrier wall 665 further promote high impedance.

Thus, the embodiments shown in FIGS. 5A–6D depict alternative configurations for a cleaning mechanism for a wire or wire-like electrode in a transporter-conditioner unit.

Figures 7A, 7B, 7C, 7D, 7E:
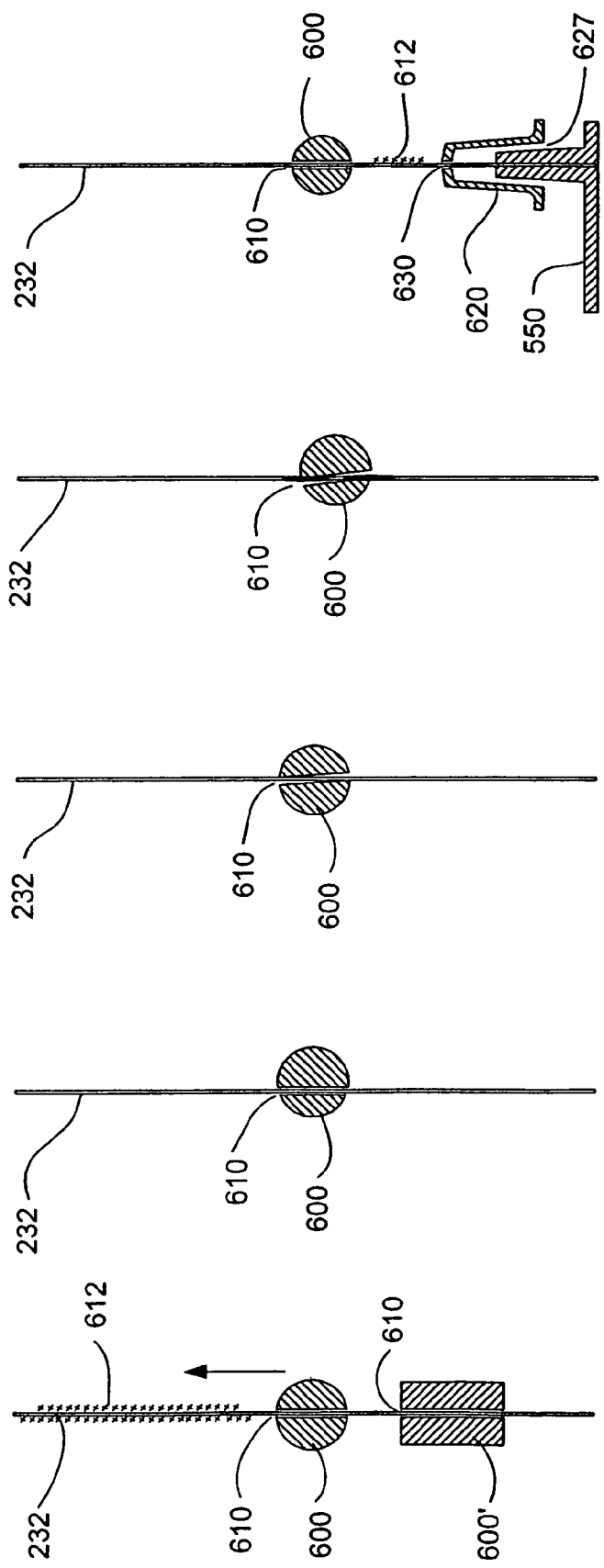
FIGS. 7A–7E depict cross-sectional views of bead-like mechanisms to clean first electrode array electrodes, according to the present invention.

Turning now to FIGS. 7A–7E, various bead-like mechanisms are shown for cleaning deposits from the outer surface of wire electrodes 232 in a first electrode array 230 in a transporter-converter unit. In FIG. 7A a symmetrical bead 600 is shown surrounding wire element 232, which is passed through bead channel 610 at the time the first electrode array is fabricated. Bead 600 is fabricated from a material that can withstand high temperature and high voltage, and is not likely to char, ceramic or glass, for example. While a metal bead would also work, an electrically conductive bead material would tend slightly to decrease the resistance path separating the first and second electrode arrays, e.g., by approximately the radius of the metal bead. In FIG. 7A, debris and deposits 612 on electrode 232 are depicted as "x's". In FIG. 7A, bead 600 is moving in the direction shown by the arrow relative to wire 232. Such movement can result from the user inverting unit 100, e.g., turning the unit upside down. As bead 600 slides in the direction of the arrow, debris and deposits 612 scrape against the interior walls of channel 610 and are removed. The removed debris can eventually collect at the bottom interior of the transporter-conditioner unit. Such debris will be broken down and vaporized as the unit is used, or will accumulate as particulate matter on the surface of electrodes 242. If wire 232 has a nominal diameter of say 0.1 mm, the diameter of bead channel 610 will be several times larger, perhaps 0.8 mm or so, although greater or lesser size tolerances can be used. Bead 600 need not be circular and can instead be cylindrical as shown by bead 600' in FIG. 7A. A circular bead can have a diameter in the range of perhaps 0.3" to perhaps 0.5". A cylindrical bead might have a diameter of say 0.3" and be about 0.5" tall, although different sizes could of course be used.

As indicated by FIG. 7A, an electrode 232 can be strung through more than one bead 600, 600'. Further, as shown by FIGS. 7B-7D, beads having different channel symmetries and orientations can be used as well. It is to be noted that while it can be most convenient to form channels 610 with circular cross-sections, the cross-sections could in fact be non-circular, e.g., triangular, square, irregular shape, etc.

FIG. 7B shows a bead 600 similar to that of FIG. 7A, but wherein channel 610 is formed off-center to give asymmetry to the bead. An off-center channel will have a mechanical moment and will tend to slightly tension wire electrode 232 as the bead slides up or down, and can improve cleaning characteristics. For ease of illustration, FIGS. 7B–7E do not depict debris or deposits on or removed from wire or wire-like electrode 232. In the embodiment of FIG. 7C, bead channel 610 is substantially in the center of bead 600 but is inclined slightly, again to impart a different frictional cleaning action. In the embodiment of FIG. 7D, beam 600 has a channel 610 that is both off center and inclined, again to impart a different frictional cleaning action. In general, an asymmetrical bead channel or through-opening orientations are preferred.

FIG. 7E depicts an embodiment in which a bell-shaped walled bead 620 is shaped and sized to fit over a pillar 550 connected to a horizontal portion 560 of an interior bottom portion of unit 100. Pillar 550 retains the lower end of wire or wire-like electrode 232, which passes through a channel 630 in bead 620, and if desired, also through a channel 610 in another bead 600. Bead 600 is shown in phantom in FIG. 7E to indicate that it is optional.

Friction between debris 612 on electrode 232 and the mouth of channel 630 will tend to remove the debris from the electrode as bead 620 slides up and down the length of the electrode, e.g., when a user inverts transporter-conditioner unit 100, to clean electrodes 232. It is understood that each electrode 232 will include its own bead or beads, and some of the beads can have symmetrically disposed channels, while other beads can have asymmetrically disposed channels. An advantage of the configuration shown in FIG. 7E is that when unit 100 is in use, e.g., when bead 620 surrounds pillar 570, with an air gap therebetween, improved breakdown resistance is provided, especially when bead 620 is fabricated from glass or ceramic or other high voltage, high temperature breakdown material that will not readily char. The presence of an air gap between the outer surface of pillar 570 and the inner surface of the bell-shaped bead 620 helps increase this resistance to high voltage breakdown or arcing, and to charring.

Figure 8A:
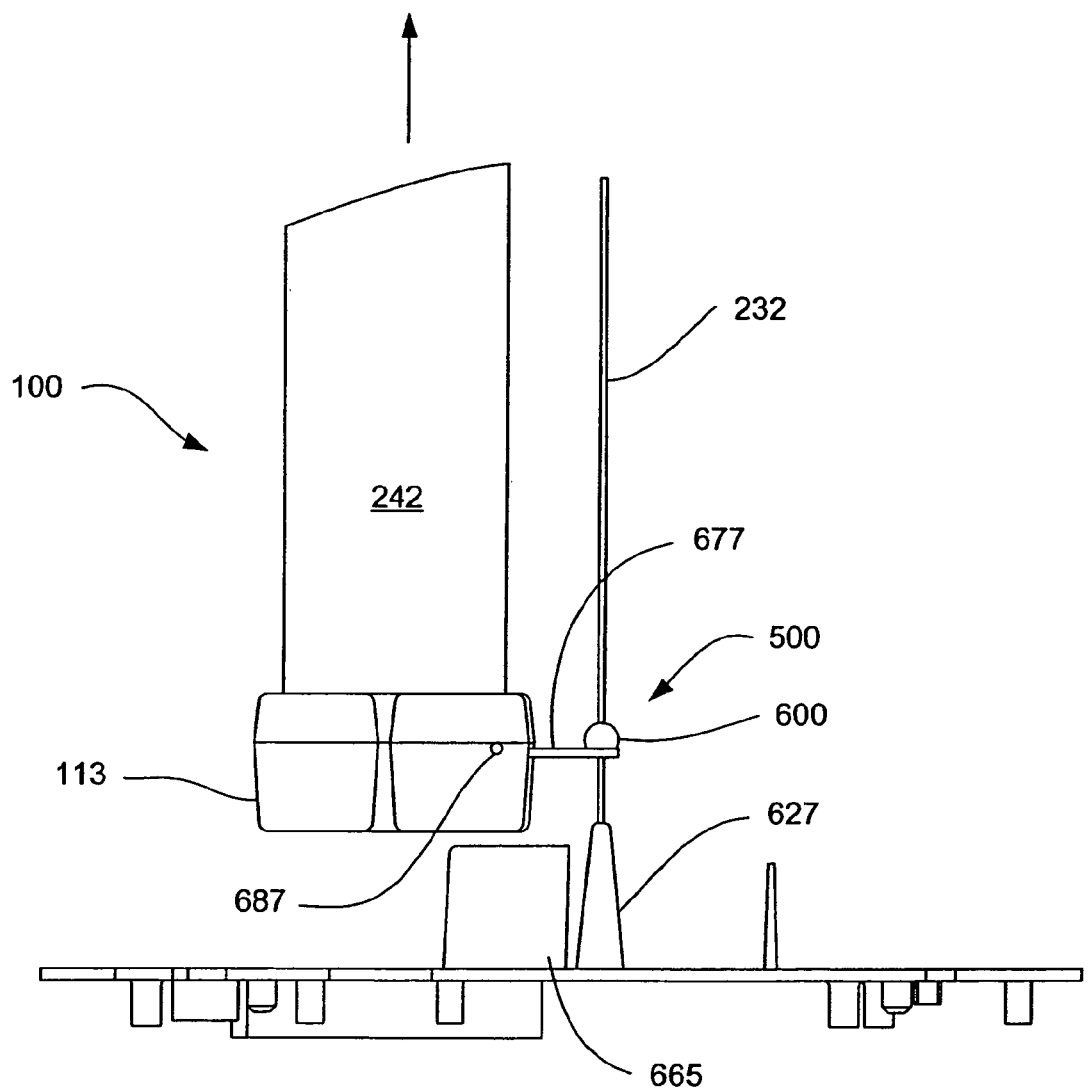
FIG. 8A depicts a cross sectional view of another embodiment of a cleaning mechanism of the invention illustrating a bead positioned atop a bead lifting arm.

Turning now to another embodiment of the invention, in FIG. 8A, a side view of an cleaning mechanism 500 is depicted. Cleaning mechanism 500 in this preferred embodiment includes projecting, bead lifting arms 677 extending from the longitudinal axis of collector electrode base 113 into a horizontal disposition. Bead lifting arms 677 include a distal end 679 which is fork-shaped, having two prongs that extend on each side of an emitter or first electrode 232 (FIG. 8C). Unlike other embodiments, the two prongs of distal end 679 do not engage the electrode 232 as the cleaning is accomplished with the bead 600 as described below. Preferably the bead lifting arm 677 is comprised of an insulating material or other high voltage, high temperature breakdown resistant material. For example ABS plastic can be used to construct bead lifting arm 677.

Figure 8B:
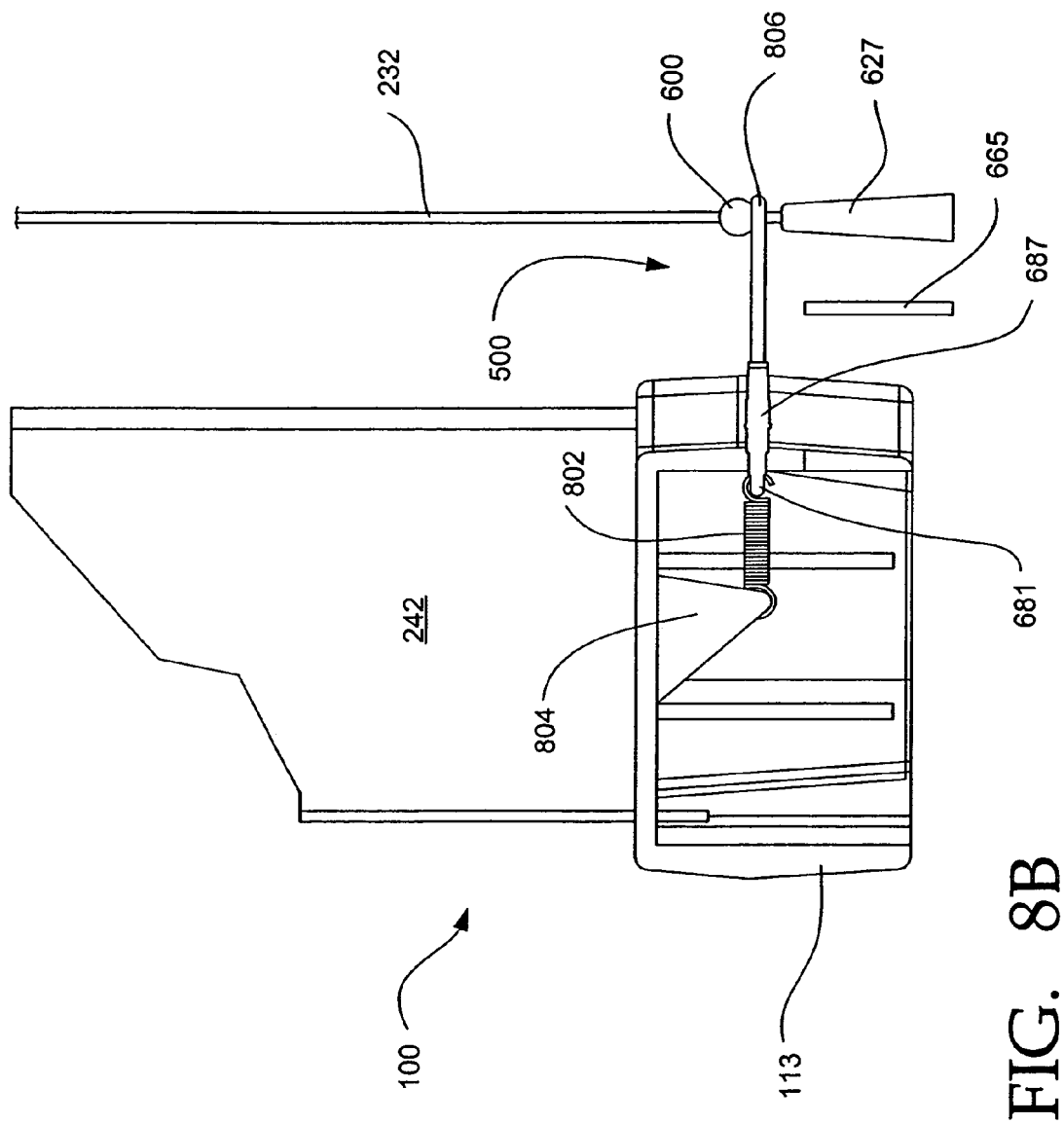
FIG. 8B depicts a cut away view of the embodiment of the invention of FIG. 8A illustrating the bead lifting arm.
Figure 8C:
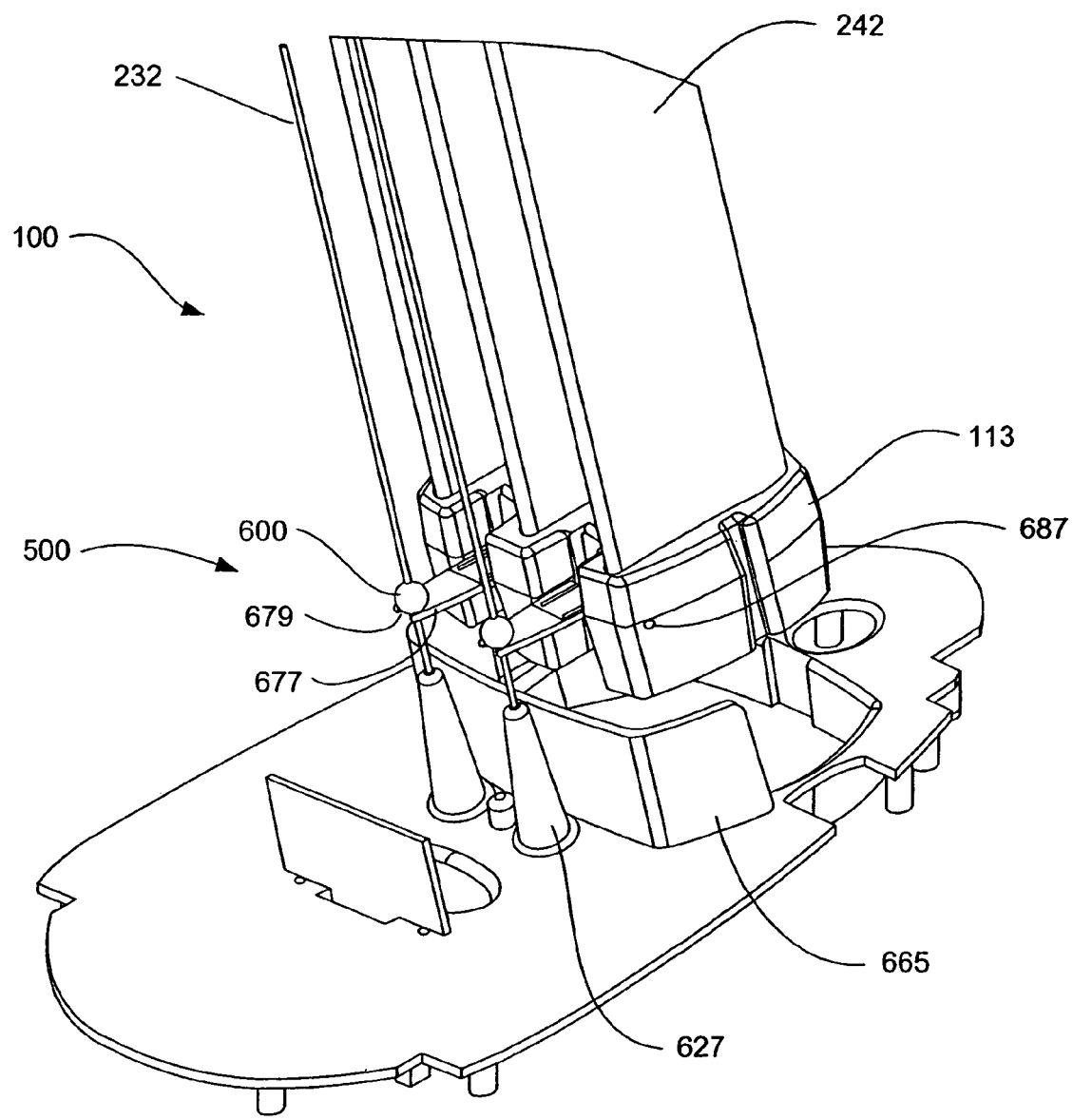
FIG. 8C depict a perspective view of the embodiment of the invention depicted in FIGS. 8A and 8B.

In the preferred embodiment, the bead lifting arm 677 is configured so that the arm sits below bead 600 with the collector electrode 242 fully seated in the unit 100 as shown in FIG. 8B. When the electrodes 242 are removed from the unit 100, the bead lifting arm 677 lifts the bead 600 upward, away from pylons or electrode bottom end stop 627 along the length of electrodes 232. It will be appreciated by those of skill in the art that the bead 600 depicted in this figure may take on a variety of shapes and configurations without departing from the scope of the invention. For example, the bead 600 may take on the various configurations as shown in FIG. 7 with respect to orientation of the bore. Similarly, with respect to shape, the bead bore can be spherical, hemispherical, square, rectangular or a variety of other shapes without departing from the scope of the invention as previously discussed. Further, the bead 600 can be comprised of a variety of materials as previously described.

Turning now to FIG. 8B electrode 242 is shown seated in the unit 100. In this embodiment, the bead lifting arm 677 is pivotally mounted to the base 113 of the collectors 242 at pivot axis 687. The end 681 of the bead lifting arm 622 has a spring 802 attached thereto. The other end of spring 802 is attached to a bracket 804 which projects below the collector electrodes 242. Accordingly the bead lifting arm 677 is capable of deflecting when the electrode 242 is removed from the housing 102. The spring 802 has enough stiffness to allow the lifting of the bead 600 along the surface of the electrode 232, when the electrode 242 is removed from the housing 102. As will be appreciated by those of skill in the art, the bead need not be lifted the entire length of the electrode 242, but should be lifted along a length of the electrode 242 sufficient to enable the electrode to function as designed.

The embodiment of the invention depicted in FIGS. 8A, 8B and 8C operates as follows. With the electrodes 242 in the down or operating position, the base 113 of the electrodes 242 seats behind the barrier wall 665 as shown in FIG. 8B. In order to reach this position, the bead lifting arm 677 pivots about pivot point 687 as they are deflected around the bead 600 in order to be positioned below the bead 600 as shown in FIGS. 8A and 8B. Once the lifting arm 677 has been deflected so that it is urged around and below bead 600, the lifting arm 677 snaps back into the horizontal position as shown in FIGS. 8A and 8B, below and ready to lift the bead 600.

When it is desired to clean the electrodes, the collector electrodes 242 are lifted from the housing. As this is accomplished, the bead lifting arm 677 lifts the bead 600 from the position shown in FIGS. 8A and 8B, to the top of the emitter electrodes 232, thereby cleaning the emitter electrodes as the beads are lifted. Once the beads are lifted to the top of the emitter electrodes 232, the lifting arm 677 is deflected around the beads 600 as the bead lifting arm 677 around pivot point 687. As this occurs, the bead 600 falls away from the lifting arm 677 as the collector electrodes 242 are completely removed from the housing. The bead then drop to the base of the emitter electrode 232 and come in contact with the pylon 627 where the bead rest until the bead again engage with the bead lifting arm 677. After the electrodes 242 are cleaned, as for example by wiping them with a cloth, the electrodes 242 are reinserted into the housing with the base 113 of the electrodes 242 once again coming into proximity of the barrier wall 665. As this occurs, the bead lifting arms 677 are again deflected about the bead 600 so that they come into the position between the bead 600 and the pylon 627, ready again to lift the bead 600 upwardly as and when the collector electrodes 242 are again removed upwardly from the housing in order to clean the electrodes. It is to be understood that the bead 600 operate to clean the emitter electrodes in much the same way as beads 600 operate in FIGS. 7A–7E.

In alternative embodiment, the lifting arms 677 themselves actually engage and clean the emitter electrodes 232 as described in the other embodiments. In this arrangement, the lifting arm 677 can also be configured much as the distal end of the arm 677 in FIG. 6A as well as the distal end of the arm 515 in FIG. 5C. In these embodiments, the distal end of the arm 677 engages and cleans the emitter electrode 232 as well as lifts the bead which also cleans the emitter electrode. Also in these alternative embodiments, the arm must be sufficiently stiff so that as well as cleaning the electrode, the arm also is able to lift the weight of the beads 600.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention from the various embodiments and with various modifications that are suited to the particular use contemplated. It is intended that the scope of the invention be defined by the following claims and their equivalence.

What is claimed is:

1. An air conditioner device, comprising:
    a portable housing;
    an ion generator disposed in said housing, said ion generator comprising: an emitter electrode;
    a collector electrode; and
    a source of high voltage to provide a potential difference between said emitter and collector electrodes;
    a free-floating cleaning member engaging said emitter electrode, said cleaning member adapted to frictionally remove debris from said emitter electrode as said cleaning member is moved along said emitter electrode; and
    a lifting arm to move said cleaning member along said emitter electrode.

2. The device of claim 1, wherein said lifting arm releases said cleaning member when said cleaning member reaches an upper end of said emitter electrode, thereby causing said cleaning member to return to an initial position.

3. The device of claim 1, wherein said lifting arm is caused to pivot when said cleaning member reaches an upper end of said emitter electrode, thereby causing said cleaning member to drop back to the resting position near a lower end of said emitter electrode.

4. The device of claim 1, wherein: said collector electrode is movable relative to said housing;
    said lifting arm is operably associated with said collector electrode; and
    said cleaning member is moved along said emitter electrode as said collector electrode is moved relative to said housing.

5. The device of claim 4, wherein said lifting arm is attached to a base associated with said collector electrode.

6. The device of claim 5, wherein said cleaning member normally rests near a lower end of said emitter electrode when said cleaning member is not being moved along said emitter electrode.

7. The device of claim 6, wherein said lifting arm is pivotally attached to said base such that with said cleaning member resting near the lower end of said emitter electrode, said lifting arm can pivot past said cleaning member and be positioned under said cleaning member in preparation for moving said cleaning member to clean said emitter electrode.

8. The device of claim 7, wherein said lifting arm has a distal end which has first and second prongs extending therefrom, which first and second prongs can be selectively positioned extending past said emitter electrode with said emitter electrode located between said prongs.

9. An air conditioner device, comprising:
    a freestanding portable housing;
    an ion generator disposed in said housing, said ion generator comprising:
    an emitter electrode;
    a collector electrode that can be extended out of an upper portion of said housing by moving said collector electrode vertically upward; and
    a source of high voltage to provide a potential difference between said emitter and collector electrodes;
    a free-floating cleaning member engaging said emitter electrode, said cleaning member adapted to frictionally remove debris from said emitter electrode as said cleaning member is moved along said emitter electrode; and
    a lifting arm to move said cleaning member along said emitter electrode;
    wherein said lifting arm is caused to pivot when said cleaning member reaches an upper end of said emitter electrode, thereby causing said cleaning member to drop back to the resting position near a lower end of said emitter electrode.

10. The device of claim 9, wherein said lifting arm is operably associated with said collector electrode.

11. The device of claim 10, wherein said cleaning member is moved along said emitter electrode as said collector electrode is moved relative to said housing.

12. The device of claim 11, wherein said lifting arm is attached to a base associated with said collector electrode.

13. The device of claim 12, wherein said lifting arm is pivotally attached to said base such that with said cleaning member resting near the lower end of said emitter electrode, said lifting arm can pivot past said cleaning member and be positioned under said cleaning member in preparation for moving said cleaning member to clean said emitter electrode.

14. The device of claim 9, wherein said cleaning member normally rests near a lower end of said emitter electrode when said cleaning member is not being moved along said emitter electrode.

15. The device of claim 9, wherein said lifting arm has a distal end which has first and second prongs extending therefrom, which first and second prongs can be selectively positioned extending past said emitter electrode with said emitter electrode located between said prongs.

16. An air conditioner device, comprising: a freestanding housing; a wire-shaped emitter electrode within said housing;
   a collector electrode adapted to rest within said housing, yet is removable through an upper portion of said housing to thereby allow said collector electrode to be cleaned; and
   a source of high voltage to provide a potential difference between the said emitter and collector electrodes;
   a cleaning member engaging said wire-shaped emitter electrode, said cleaning member adapted to frictionally remove debris from said wire-shaped emitter electrode when said cleaning member is moved along the said wire-shaped emitter electrode; and
   a lifting arm operably associated with said collector electrode and operably engageable with said cleaning member in order to move said cleaning member along said wire-shaped emitter electrode when said collector electrode is removed through said upper portion of said housing.

17. The device of claim 16, wherein said lifting arm moves said cleaning member in a vertical direction along said wire-shaped emitter electrode when said collector electrode is removed through said upper portion of said housing.

18. The device of claim 17, wherein said cleaning member drops back to the resting position when said collector electrode is removed from said housing.

19. The device of claim 16, wherein said wire-shaped emitter electrode is not readily removable from said housing.

20. The device of claim 16, wherein said cleaning member includes an opening corresponding to said emitter electrode, wherein an inner surface of said opening scrapes against an outer surface of said emitter electrode as said cleaning member is moved.

* * * * *

UNITED STATES PATENT AND TRADEMARK OFFICE
CERTIFICATE OF CORRECTION

| | | |
|---|---|---|
| PATENT NO. | : 7,056,370 B2 | Page 1 of 1 |
| APPLICATION NO. | : 11/087969 | |
| DATED | : June 6, 2006 | |
| INVENTOR(S) | : Reeves et al. | |

It is certified that error appears in the above-identified patent and that said Letters Patent is hereby corrected as shown below:

Item (63) in the Related U.S. Application Data on the first page of the patent, the reference number "10/287,193" should read -- 10/278,193 --.

Signed and Sealed this
Twenty-second Day of November, 2011

David J. Kappos
*Director of the United States Patent and Trademark Office*